United States Patent
Zhao et al.

(10) Patent No.: US 9,907,029 B2
(45) Date of Patent: Feb. 27, 2018

(54) POWER ALLOCATION OPTIMIZATION UNDER CONSTRAINTS OF THROUGHPUT REQUIREMENTS AND INTERFERENCE LIMIT FOR COGNITIVE RADIO NETWORKS

(71) Applicant: Macau University of Science and Technology, Macau (MO)

(72) Inventors: Qinglin Zhao, Macau (MO); Yuan Wu, Hangzhou (CN); Yanfei He, Hangzhou (CN); Jiachao Chen, Hangzhou (CN); Liping Qian, Hangzhou (CN)

(73) Assignee: Macau University of Science and Technology, Macau (MO)

( * ) Notice: Subject to any disclaimer, the term of this patent is extended or adjusted under 35 U.S.C. 154(b) by 0 days.

(21) Appl. No.: 15/219,291

(22) Filed: Jul. 26, 2016

(65) Prior Publication Data
US 2017/0026913 A1      Jan. 26, 2017

Related U.S. Application Data

(60) Provisional application No. 62/197,016, filed on Jul. 26, 2015.

(51) Int. Cl.
*H04W 52/24* (2009.01)
*H04W 52/52* (2009.01)
*H04W 52/26* (2009.01)

(52) U.S. Cl.
CPC ......... *H04W 52/243* (2013.01); *H04W 52/52* (2013.01); *H04W 52/267* (2013.01)

(58) Field of Classification Search
CPC . H04W 52/24; H04W 52/243; H04W 52/244; H04W 52/267; H04W 16/14; H04W 52/52
See application file for complete search history.

(56) References Cited

U.S. PATENT DOCUMENTS

| | | | |
|---|---|---|---|
| 9,628,996 B2 * | 4/2017 | Chae | H04W 16/14 |
| 9,713,056 B2 * | 7/2017 | Elsherif | H04W 36/22 |
| 2002/0003806 A1 * | 1/2002 | McKinnon, III | H04L 12/2801 370/437 |
| 2003/0104817 A1 * | 6/2003 | Damnjanovic | H04W 72/1226 455/452.1 |

(Continued)

OTHER PUBLICATIONS

Y.C. Liang, K.C. Chen, G.Y. Li, and P. Mahonen: Cognitive Radio Networking and Communications: An Overview. IEEE Transactions on Vehicular Technology, vol. 60, No. 7, pp. 3386-3407, (2011).

(Continued)

*Primary Examiner* — Devan Sandiford
(74) *Attorney, Agent, or Firm* — Spruson & Ferguson (HK)

(57) ABSTRACT

The present invention provides a method of power control for a plurality of secondary users (SUs), or unlicensed users, in a cognitive radio network having a plurality of primary users (PUs), or licensed users. The method comprises determining an optimal power level for each of the SUs such that a total throughput of all the SUs is maximized while satisfying an individual throughput requirement of each SU and an interference limit constraint of the PUs. In particular, a case having two SUs is considered.

13 Claims, 15 Drawing Sheets

(a) Case I: $Q$ between $l_1$ and $l_2$

(56) References Cited

U.S. PATENT DOCUMENTS

| | | | |
|---|---|---|---|
| 2009/0286480 A1* | 11/2009 | Cho | H04L 5/0028 455/62 |
| 2009/0323619 A1* | 12/2009 | Tajer | H04W 72/08 370/329 |
| 2010/0304680 A1* | 12/2010 | Kuffner | H04B 7/10 455/63.1 |
| 2010/0330919 A1* | 12/2010 | Gurney | H04W 52/367 455/67.11 |
| 2011/0028180 A1* | 2/2011 | Sawai | H04W 52/24 455/522 |
| 2011/0188478 A1* | 8/2011 | Elezabi | H04B 7/216 370/335 |
| 2012/0083303 A1* | 4/2012 | Min | H04W 16/14 455/502 |
| 2012/0108276 A1* | 5/2012 | Lang | H04L 27/0006 455/501 |
| 2012/0128043 A1* | 5/2012 | Hong | H04W 16/14 375/219 |
| 2012/0172049 A1* | 7/2012 | Wu | H04W 72/085 455/452.1 |
| 2013/0344913 A1* | 12/2013 | Li | H04W 52/244 455/522 |
| 2014/0219243 A1* | 8/2014 | Meshkati | H04W 52/243 370/331 |
| 2014/0220901 A1* | 8/2014 | Selen | H04W 16/14 455/63.1 |
| 2015/0126236 A1* | 5/2015 | Mukherjee | H04B 7/0417 455/522 |
| 2015/0148091 A1* | 5/2015 | Murai | H04W 16/14 455/522 |
| 2016/0212758 A1* | 7/2016 | Leung | G06Q 10/00 |

OTHER PUBLICATIONS

Y. Liu, L.X. Cai, H. Luo, and X. Shen: Deploying Cognitive Cellular Networks under Dynamic Resource Management. IEEE Wireless Communications, vol. 20, No. 2, pp. 82-88, (2013).

A. Gjendemsio, D. Gesbert, G.E. Oien, and S.G. Kiani: Optimal Power Allocation and Scheduling for Two-Cell Capacity Maximization. Proceedings of International Symposium on Modeling and Optimization in Mobile, Ad Hoc and Wireless Networks (2006).

C.S. Chen, G.E. Oien: Optimal Power Allocation for Two-Cell Sum Rate Maximization under Minimum Rate Constraints. Proceedings of IEEE International Symposium on Wireless Communication Systems (2008).

V. Chandrasekhar, Z.K. Shen: Optimal Uplink Power Control in Two-Cell Systems with Rise-Over-Thermal Constraints. IEEE Communications Letters, vol. 12, No. 3, pp. 173-175, (2008).

C.H. Yu, K. Doppler, C.B. Ribeiro, and O. Tirkkonen: Resource Sharing Optimization for Device-to-Device Communication Underlaying Cellular Networks. IEEE Transactions on Wireless Communications, vol. 10, No. 8, pp. 2752-2763, (2011).

Y. Wu, T.Y. Zhang, Danny H.K. Tsang: Joint Pricing and Power Allocation for Dynamic Spectrum Access Networks with Stackelberg Game Model. IEEE Transactions on Wireless Communications, vol. 10, No. 1, pp. 12-19, (2011).

Y. Wu, Q.H. Zhu, J.W Huang, Danny H.K. Tsang: Revenue Sharing based Resource Allocation for Dynamic Spectrum Access Networks. IEEE Journal on Selected Areas in Communications, vol. 32, No. 11, pp. 2280-2297, (2014).

J.W. Huang, R. Berry, and M. L. Honig: Auction-Based Spectrum Sharing. ACM MONET, vol. 11, No. 3, pp. 405-418, (2016).

* cited by examiner (a) Case I: $Q$ between $l_1$ and $l_2$ (b) Case II: $Q$ above $l_1$ and $l_2$ (c) Case III: $Q$ below $l_1$ and $l_2$ (b) Interference limit Γ = 0.15.

(c) Interference limit Γ = 0.2.

(a) Interference channel gains $g_{12} = g_{21} = 0.01$.

(b) Interference channel gains $g_{12} = g_{21} = 0.02$.

(c) Interference channel gains $g_{12} = g_{21} = 0.03$.

(a) Interference limit Γ = 0.1.

(b) Interference limit $\Gamma = 0.15$.

(c) Interference limit Γ = 0.2.

POWER ALLOCATION OPTIMIZATION UNDER CONSTRAINTS OF THROUGHPUT REQUIREMENTS AND INTERFERENCE LIMIT FOR COGNITIVE RADIO NETWORKS

CROSS-REFERENCE TO RELATED APPLICATIONS

This application claims the benefit of U.S. Provisional Patent Application No. 62/197,016, filed on Jul. 26, 2015, which is incorporated by reference herein in its entirety.

BACKGROUND

Field of the Invention

The present invention relates to power control for a cognitive radio communication system.

List of References

There follows a list of references that are occasionally cited in the specification. Each of the disclosures of these references is incorporated by reference herein in its entirety.
[1] Y. C. Liang, K. C. Chen, G. Y. Li, and P. Mahonen: Cognitive Radio Networking and Communications: An Overview. *IEEE Transactions on Vehicular Technology*, vol. 60, no. 7, pp. 3386-3407, (2011)
[2] Y. Liu, L. X. Cai, H. Luo, and X. Shen: Deploying Cognitive Cellular Networks under Dynamic Resource Management. *IEEE Wireless Communications*, Vol. 20, No. 2, pp. 82-88, (2013)
[3] A. Gjendemsio, D. Gesbert, G. E. Oien, and S. G. Kiani: Optimal Power Allocation and Scheduling for Two-Cell Capacity Maximization. *Proceedings of International Symposium on Modeling and Optimization in Mobile, Ad Hoc and Wireless Networks* (2006)
[4] C. S. Chen, G. E. Oien: Optimal Power Allocation for Two-Cell Sum Rate Maximization under Minimum Rate Constraints. *Proceedings of IEEE International Symposium on Wireless Communication Systems* (2008)
[5] V. Chandrasekhar, Z. K. Shen: Optimal Uplink Power Control in Two-Cell Systems with Rise-Over-Thermal Constraints. *IEEE Communications Letters*, vol. 12, no. 3, pp. 173-175, (2008)
[6] C. H. Yu, K. Doppler, C. B. Ribeiro, and O. Tirkkonen: Resource Sharing Optimization for Device-to-Device Communication Underlaying Cellular Networks. *IEEE Transactions on Wireless Communications*, vol. 10, no. 8, pp. 2752-2763, (2011)
[7] Y. Wu, T. Y. Zhang, Danny H. K. Tsang: Joint Pricing and Power Allocation for Dynamic Spectrum Access Networks with Stackelberg Game Model. *IEEE Transactions on Wireless Communications*, vol. 10, no. 1, pp. 12-19, (2011)
[8] Y. Wu, Q. H. Zhu, J. W Huang, Danny H. K. Tsang: Revenue Sharing based Resource Allocation for Dynamic Spectrum Access Networks. *IEEE Journal on Selected Areas in Communications*, vol. 32, no. 11, pp. 2280-2297, (2014)
[9] J. W. Huang, R. Berry, and M. L. Honig: Auction-Based Spectrum Sharing. ACM MONET, vol. 11, no. 3, pp. 405-418, (2006)

Description of Related Art

With a rapid growth of wireless services in the past decades, the issue of spectrum congestion has attracted a lot of research interest. Spectrum sharing via cognitive radio (CR), in which unlicensed users are eligible to share the spectrum with the licensed users, has been considered as a promising approach to improve the spectrum utilization and to relieve the spectrum congestion problem [1], [2]. In the art, a licensed user and an unlicensed user are also called as a primary user (PU) and a secondary user (SU), respectively. The premise of the spectrum sharing via CR lies in that the transmissions of SUs cannot cause a harmful influence to the PU, which consequently necessitates a careful design of power control such that (i) each SU can obtain a satisfactory throughput, and (ii) the aggregate interference caused by the SUs' transmissions does not exceed a tolerable threshold set by the PU.

To the best of the inventors' knowledge, it is an open topic in the art to analytically derive the SUs' optimal power allocations when the PU's interference limit, a critical property for spectrum sharing cognitive radio, is taken into account. Although there exist previous works investigating the power allocations for multiple SUs subject to the PUs' interference limit constraints by using algorithmic approaches [7]-[9], these works seldom can derive the optimal power allocations analytically.

There is a need in the art for analytically deriving optimal power allocations for SUs under PUs' interference limit constraints so as to apply the derived power allocations for cognitive radio networks.

SUMMARY OF THE INVENTION

An aspect of the present invention is to provide a method of power control for a plurality of SUs in a cognitive radio network having a plurality of PUs. The method comprises determining an optimal power level for each of the SUs such that a total throughput of all the SUs is maximized while satisfying an individual throughput requirement of each SU and an interference limit constraint of the PUs.

Other aspects of the present invention are disclosed as illustrated by the embodiments hereinafter.

DETAILED DESCRIPTION

Figure 1:
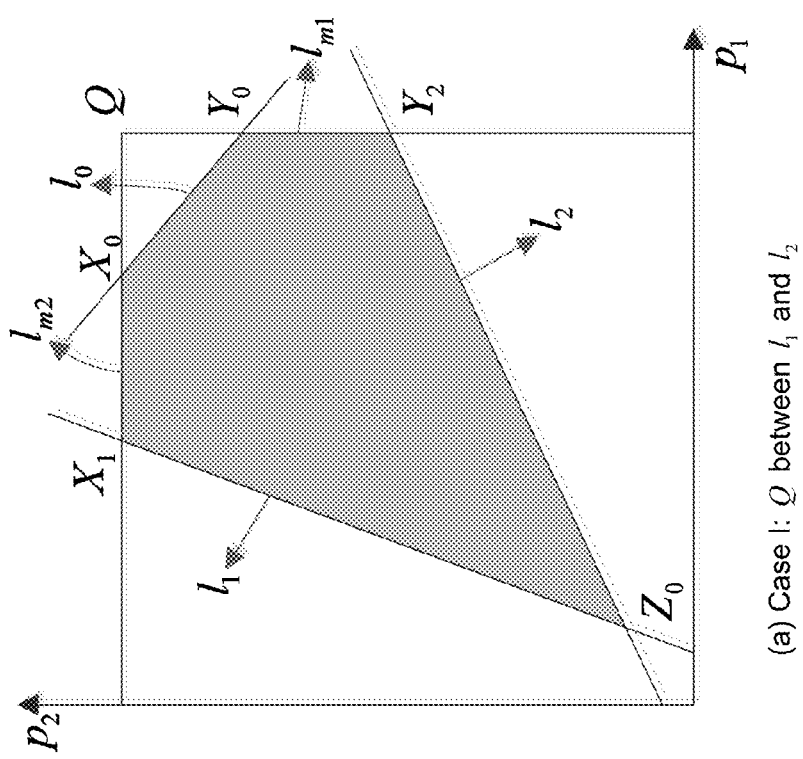
FIG. 1 depicts different cases of the feasible region of Problem (P1) according to the different locations of Q relative to $l_1$ and $l_2$.
Figure 1:
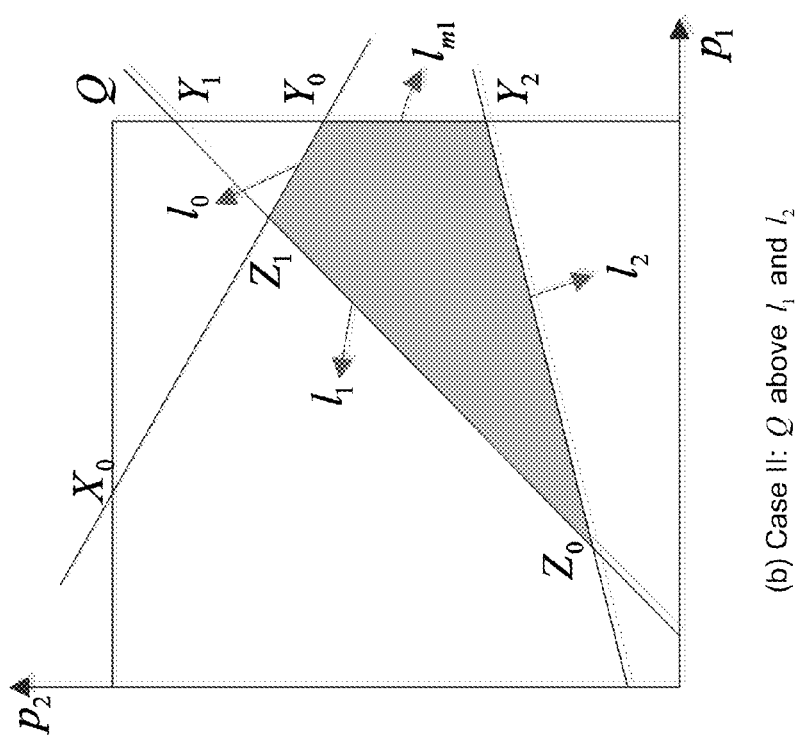
Figure 1:
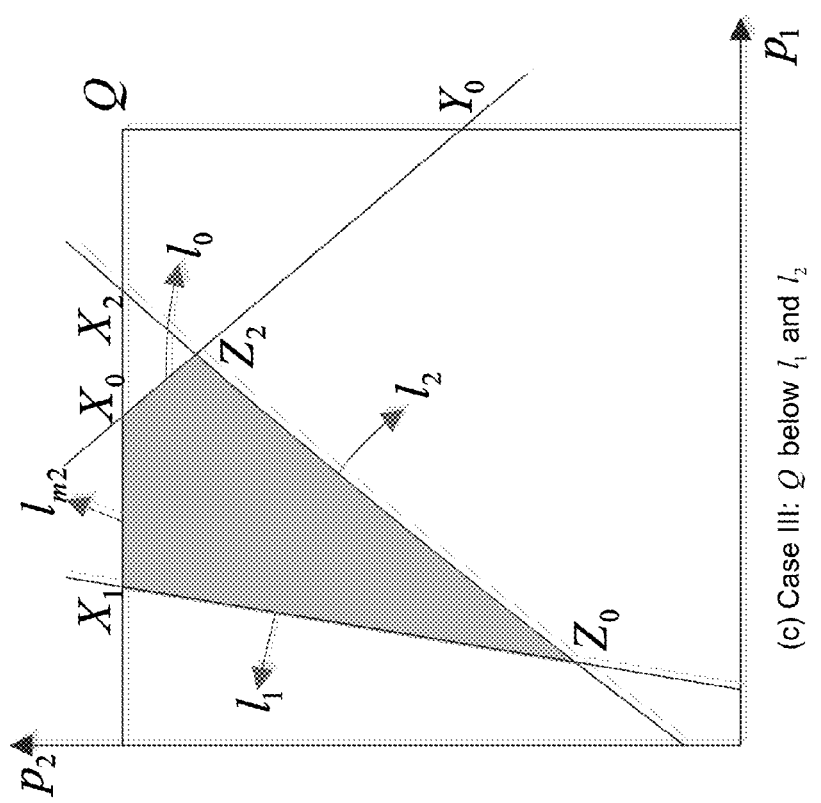

The present work aims at analytically deriving optimal power allocations for maximizing the SUs' total throughput while taking into account each SU's individual throughput requirement and the PU's interference limit constraint.

To analytically derive the optimal power allocations, we focus on the case of two SUs sharing the spectrum of a PU. In particular, the problem is similar to the two-users transmit power control problem in wireless interference channel, which has been studied in [3]-[6] but without taking into account the PU's interference limit. Specifically, [3] investigated the power allocations for two mobile users in two different cells but only considered each user's peak transmit power constraint. As an extension of [3], [4] further considered each user's minimum throughput requirement. Both [3] and [4] showed that the optimal power allocations exhibited a so-called binary property. Reference [5] formulated a rise-over-thermal constraint (which can be treated as the interference limit at each mobile user) and revealed that the optimal power allocations only resided on one of the vertexes of the feasible region. Reference [6] investigated the power allocations for two interfering device-to-device users with both having the maximum and minimum rate constraints. Again, the optimal power allocations were found only at the vertexes of the feasible region.

Different from the previous works [7]-[9], we find that besides the vertexes of the feasible region, the SUs' optimal power allocations might also reside on the boundary of the feasible region that corresponds to the PU's interference limit (which thus are more general than the previous works). We validate this result via extensive numerical simulations and also show how the PU's interference limit influences the derived optimal power allocations.

A. System Model, Problem Formulation, and Solvability of the Problem

A.1 System Model and Problem Formulation

We consider a scenario of two SUs sharing the licensed spectrum of one PU. Each SU comprises a transmitter and a receiver, and the PU performs the uplink transmission to the base station (BS). Let $p_1$ and $p_2$ denote transmit powers of SU1 and SU2, respectively. We consider the two-user throughput maximization problem as follows:

$$(P1): \max F(p_1, p_2) = \quad (1)$$
$$W\log_2\left(1 + \frac{p_1 g_{11}}{n_1 + p_2 g_{21}}\right) + W\log_2\left(1 + \frac{p_2 g_{22}}{n_2 + p_1 g_{12}}\right)$$

subject to: $p_1 g_{1B} + p_2 g_{2B} \leq \Gamma$, $$\frac{p_1 g_{11}}{n_1 + p_2 g_{21}} \geq \gamma_1, \quad (2)$$

$$\frac{p_2 g_{22}}{n_2 + p_1 g_{12}} \geq \gamma_2, \quad (3)$$

$$0 \leq p_1 \leq p_1^{max}, \text{ and } 0 \leq p_2 \leq p_2^{max}. \quad (4)$$

Specifically, $g_{ii}$ denotes the channel power gain from the transmitter of SU i to its receiver, $g_{ij}$ denotes the channel power gain from the transmitter of SU i to the receiver of SU j, and $g_{iB}$ denotes the channel power gain from the transmitter of SU i to the BS. Besides, $n_i$ denotes the power of the background noise experienced by the receiver of SU i (Notice that $n_i$ can also incorporate the interference from the PU to SU i), and W denotes the bandwidth of the PU's channel. Without loss of generality, W is assumed to be unity (i.e. W=1) hereinafter for easy presentation. Constraint (1) ensures that the total interference from the two SUs cannot exceed the PU's interference limit, which is denoted by $\Gamma$. Constraints (2) and (3) ensure that each SU achieves its required signal to interference plus noise ratio denoted by $\gamma_i$ (or equivalently, each SU i achieves its required throughput $\log_2(1+\gamma_i)$ measured by the channel capacity formula). Finally, constraint (4) ensures that each SU i's transmit power cannot exceed the upper bound $p_i^{max}$. Hereinafter, we use $(p^*_1, p^*_2)$ to denote the optimal power allocations of the two SUs of Problem (P1).

A.2 Feasible Region and Feasibility of Problem (P1)

It is apparent that $(p^*_1, p^*_2)$ strongly depends on the feasible region comprised of (1)-(4). To geographically characterize the feasible region of (P1), we first define the following five lines:

$$\text{Line } l_0: p_2 = f_{l_0}(p_1) = -\frac{g_{1B}}{g_{2B}} p_1 + \frac{\Gamma}{g_{2B}}, \quad (5)$$

$$\text{Line } l_1: p_2 = f_{l_1}(p_1) = \frac{g_{11}}{\gamma_1 g_{21}} p_1 - \frac{n_1}{g_{21}}, \quad (6)$$

$$\text{Line } l_2: p_2 = f_{l_2}(p_1) = \frac{\gamma_2 g_{12}}{g_{22}} p_1 + \frac{\gamma_2 n_2}{g_{22}}, \quad (7)$$

$$\text{Line } l_{m1}: p_1 = p_1^{max}, \text{ and Line } l_{m2}: p_2 = p_2^{max}, \quad (8)$$

where lines $l_0$, $l_1$, and $l_2$ are obtained by making constraints (1), (2), and (3) strictly binding, and lines $l_{m1}$ and $l_{m2}$ are obtained by fixing $p_1 = p_1^{max}$ and $p_2 = p_2^{max}$, respectively.

The above five lines together constrain the feasible region of Problem (P1) as shown in FIG. 1. Using the five lines, we further provide a set of critical points to be used in the rest of this work in Table 1. Specifically, Table 1 shows the coordinates of each critical point (in the first column) and the two lines whose intersection point corresponds to this critical point (in the second column). For instance, point $Z_0$ in Table 1 represents the pair of minimum power allocations $(\hat{p}_1, \hat{p}_2) = ((Z_0)_h, (Z_0)_v)$ such that the SUs meet constraints (2) and (3) together exactly, where we use $(Z_0)_h$ (or $(Z_0)_v$) to denote the horizontal-coordinate (or the vertical-coordinate) of point $Z_0$, with the subscript h representing "horizontal" and subscript v representing "vertical". The same notations will be used in the rest of this work.

TABLE 1

List of Critical Points

| Critical Points and their Coordinates | Lines |
|---|---|
| $Q = (p_1^{max}, p_2^{max})$ | $l_{m1}, l_{m2}$ |
| $X_0 = \left(\frac{\Gamma - g_{2B} p_2^{max}}{g_{1B}}, p_2^{max}\right)$ | $l_0, l_{m2}$ |
| $X_1 = \left(\frac{\gamma_1 n_1 + g_{21} \gamma_1 p_2^{max}}{g_{11}}, p_2^{max}\right)$ | $l_1, l_{m2}$ |
| $X_2 = \left(\frac{g_{22} p_2^{max} - \gamma_2 n_2}{\gamma_2 g_{12}}, p_2^{max}\right)$ | $l_2, l_{m2}$ |
| $Y_0 = \left(p_1^{max}, \frac{\Gamma - g_{1B} p_1^{max}}{g_{2B}}\right)$ | $l_0, l_{m1}$ |
| $Y_1 = \left(p_1^{max}, \frac{g_{11} p_1^{max} - \gamma_1 n_1}{\gamma_1 g_{21}}\right)$ | $l_1, l_{m1}$ |

TABLE 1-continued

List of Critical Points

| Critical Points and their Coordinates | Lines |
|---|---|
| $Y_2 = \left(p_1^{max}, \dfrac{n_2\gamma_2 + g_{12}\gamma_2 p_1^{max}}{g_{22}}\right)$ | $l_2, l_{m1}$ |
| $Z_0 = \left(\dfrac{\gamma_1\gamma_2 g_{21} n_2 + \gamma_1 n_1 g_{22}}{g_{11}g_{22} - \gamma_1\gamma_2 g_{12}g_{21}}, \dfrac{n_2\gamma_2 g_{11} + \gamma_1\gamma_2 g_{12} n_1}{g_{11}g_{22} - \gamma_1\gamma_2 g_{12}g_{21}}\right)$ | $l_1, l_2$ |
| $Z_1 = \left(\dfrac{g_{21}\gamma_1\Gamma + g_{2B}n_1\gamma_1}{g_{11}g_{2B} + g_{1B}g_{21}\gamma_1}, \dfrac{g_{11}\Gamma - g_{1B}n_1\gamma_1}{g_{11}g_{2B} + g_{1B}g_{21}\gamma_1}\right)$ | $l_0, l_1$ |
| $Z_2 = \left(\dfrac{g_{22}\Gamma - g_{2B}n_2\gamma_2}{g_{22}g_{1B} + g_{2B}g_{12}\gamma_2}, \dfrac{g_{12}\gamma_2\Gamma + g_{1B}n_2\gamma_2}{g_{22}g_{1B} + g_{2B}g_{12}\gamma_2}\right)$ | $l_0, l_2$ |

As used herein, "$Z_0 \leq Q$" is used to represent element-wise no greater than, i.e. $(Z_0)_h \leq (Q)_h$ and $(Z_0)_v \leq (Q)_v$.

Using point $Z_0$, we can characterize the feasibility of Problem (P1) as follows.

Proposition 1. Problem (P1) is feasible if both conditions (C1) and (C2) below are met:

$$0 \leq Z_0 \leq Q, \quad \text{(C1): and}$$

$$(Z_0)_v \leq f_{l_0}((Z_0)_h). \quad \text{(C2):}$$

Proof:

Condition (C1) means that $Z_0$ is feasible to the transmit power capacities of the SUs in constraint (4), and condition (C2) means that $Z_0$ is feasible to the PU's interference limit in constraint (1). Recall that function $f_{l_0}(\cdot)$ has been defined in (5).

Remark 1.

Condition (C1) in Proposition 1 is equivalent to $$g_{11}g_{22} - \gamma_1\gamma_2 g_{12}g_{21} > 0. \quad (9)$$

That is, the interference channel power gains should be weaker enough to accommodate the throughput requirements of both SUs. In particular, constraint (9) means that the slope of line $l_1$ in (6) should be greater than that of $l_2$ in (7) such that their intersection (i.e. point $Z_0$) exists.

B. Optimal Power Allocations of Problem (P1)

Figure 2:
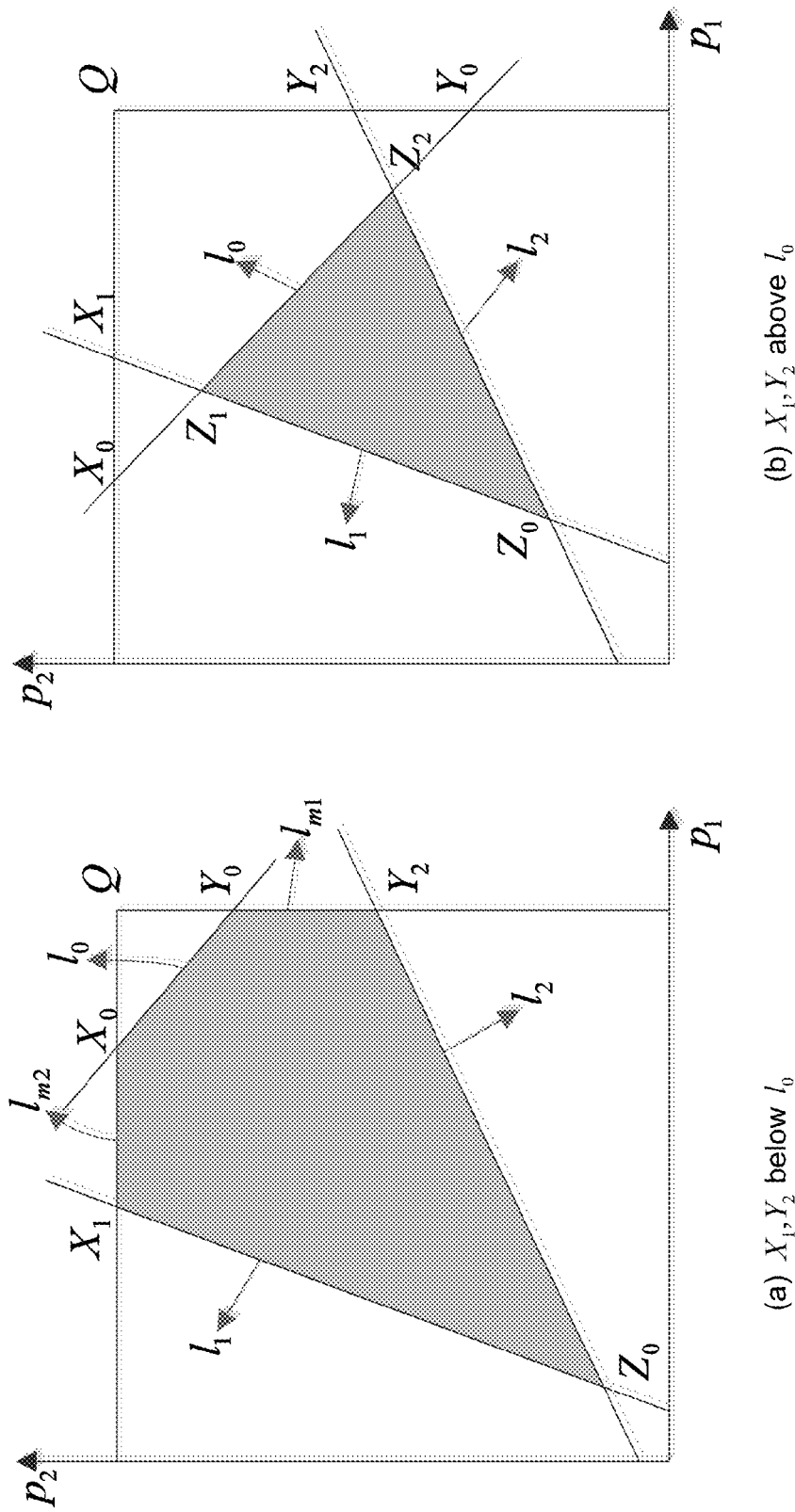
FIG. 2 depicts different subcases in Case I according to the different locations of line $l_0$ relative to points $X_1$ and $Y_2$.
Figure 2:
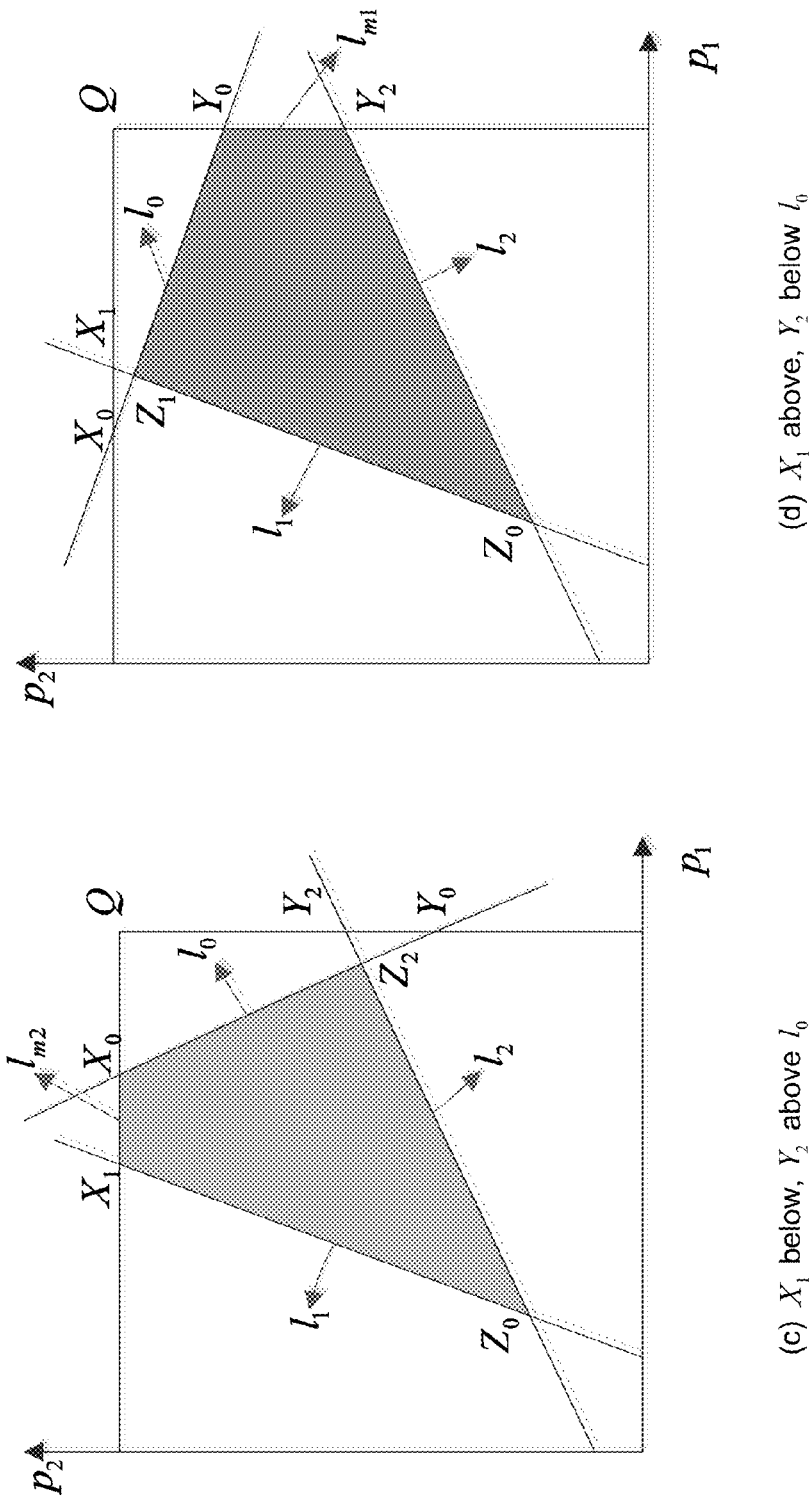

In this section, we focus on solving Problem (P1) analytically, under the condition that (P1) is feasible (that is, conditions (C1) and (C2) are met). In particular, to account for the most general case of the feasible region, we assume that $f_{l_0}((Q)_h) \leq (Q)_v$ holds. Otherwise, the PU's interference limit will not influence the feasible region of Problem (P1) at all. In this case, the optimal power allocations have been given in [4]. Graphically, it means that point Q is above line $l_0$ (that is, points $X_0$ and $Y_0$ always exist as shown in FIGS. 1 and 2), and the interference limit $\Gamma$ in constraint (1) indeed influences the feasible region.

A deep look at Problem (P1) shows that its feasible region can take the following three different cases (depending on the different positions of point Q relative to line $l_1$ and line $l_2$).

Case I: $f_{l_1}((Q)_h) \geq (Q)_v$ and $f_{l_2}((Q)_h) \leq (Q)_v$ hold, meaning that point Q is between lines $l_1$ and $l_2$, and points $X_1$ and $Y_2$ appear, as shown in FIG. 1(a). Note that functions $f_{l_1}(\cdot)$ and $f_{l_2}(\cdot)$ have been defined in (6) and (7), respectively.

Case II: $f_{l_1}((Q)_h) \leq (Q)_v$ and $f_{l_2}((Q)_h) \leq (Q)_v$ hold, meaning that point Q is above lines $l_1$ and $l_2$, and points $Y_1$ and $Y_2$ appear as shown in FIG. 1(b).

Case III: $f_{l_1}((Q)_h) \geq (Q)_v$ and $f_{l_2}((Q)_h) \geq (Q)_v$ hold, meaning that point Q is below lines $l_1$ and $l_2$, and points $X_1$ and $X_2$ appear, as shown in FIG. 1(c).

We next provide the optimal power allocations of Problem (P1) for each of the above three cases. However, even we suppose that Case I happens, it is still difficult to derive the optimal power allocations analytically, since it strongly depends on the location of $l_0$ representing the PU's interference limit. To categorize the impact of $l_0$, we further consider the following four different subcases of Case I, depending on how line $l_0$ locates with respect to points $X_1$ and $Y_2$.

Subcase I.1: $f_{l_0}((X_1)_h) \geq (X_1)_v$ and $f_{l_0}((Y_2)_h) \geq (Y_2)_v$, meaning that both points $X_1$ and $Y_2$ are below line $l_0$, and points $X_0$ and $Y_0$ appear as shown in FIG. 2(a).

Subcase I.2: $f_{l_0}((X_1)_h) \leq (X_1)_v$ and $f_{l_0}((Y_2)_h) \leq (Y_2)_v$, meaning that both points $X_1$ and $Y_2$ are above line $l_0$, and points $Z_1$ and $Z_2$ appear as shown in FIG. 2(b).

Subcase I.3: $f_{l_0}((X_1)_h) \geq (X_1)_v$ and $f_{l_0}((Y_2)_h) \leq (Y_2)_v$, meaning that point $X_1$ is below line $l_0$, and point $Y_2$ is above line $l_0$, and points $X_0$ and $Z_2$ appear as shown in FIG. 2(c).

Subcase I.4: $f_{l_0}((X_1)_h) \leq (X_1)_v$ and $f_{l_0}((Y_2)_h) \geq (Y_2)_v$, meaning that point $X_1$ is above line $l_0$, and point $Y_2$ is below line $l_0$, and points $Z_1$ and $Y_0$ appear as shown in FIG. 2(d).

B.1 Optimal Power Allocations for Subcase I.1

In this subsection, we focus on analytically deriving the optimal power allocations for Subcase I.1. We first present the following result.

Lemma 1. The optimal power allocations $(p^*_1, p^*_2)$ of Problem (P1) for Subcase I.1 (shown in FIG. 2(a)) reside within the vertexes $X_0$, $X_1$, $Y_0$, and $Y_2$, or on the line segment of $l_0$ between points $X_0$ and $Y_0$.

Proof.

Please refer to Appendix I.

To further characterize $(p^*_1, p^*_2)$ that might appear on the line segment of $l_0$ between points $X_0$ and $Y_0$, we use (1) to substitute $p_2$ by $p_1$ and equivalently transform the objective function $F(p_1, p_2)$ as:

$$\hat{F}(p_1) = \log_2\left(\dfrac{g_{21}\Gamma + g_{2B}n_1 - g_{21}g_{1B}p_1 + g_{11}g_{2B}p_1}{g_{21}\Gamma + g_{2B}n_1 - g_{21}g_{1B}p_1}\right) + \log_2\left(\dfrac{g_{2B}n_2 + g_{12}g_{2B}p_1 + g_{22}\Gamma - g_{22}g_{1B}p_1}{g_{2B}n_2 + g_{12}g_{2B}p_1}\right). \quad (10)$$

Moreover, the following result holds for the above $\hat{F}(p_1)$.

Lemma 2. Function $\hat{F}(p_1)$ has three different extremal points, which can be expressed as follows:

$$p_1^{o1} = \dfrac{-B + \sqrt{B^2 - 4AC}}{2A} \quad \text{if } A \neq 0,$$

$$p_1^{o2} = \dfrac{-B - \sqrt{B^2 - 4AC}}{2A} \quad \text{if } A \neq 0 \text{ and}$$

$$p_1^{o3} = \dfrac{-C}{B} \quad \text{if } A = 0,$$

where parameters A, B, and C are given by (11), (12) and (13), respectively, as shown below, where the superscripts $o_1$, $o_2$ and $o_3$ represent the three different cases of the extremal points:

$$A = \dfrac{g_{2B}}{\ln 2}[g_{11}g_{12}g_{2B}(n_1 g_{1B} + g_{21}\Gamma)(g_{12}g_{2B} - g_{22}g_{1B}) - g_{22}g_{21}g_{1B}(g_{1B}n_2 + g_{12}\Gamma)(g_{21}g_{1B} - g_{11}g_{2B})] \quad (11)$$

-continued $$B = \frac{g_{2B}(n_1 g_{2B} + g_{21}\Gamma)}{\ln 2} \times [g_{11}g_{2B}(2g_{12}g_{2B}n_2 + g_{12}g_{22}\Gamma - g_{22}g_{1B}n_2) - g_{22}(g_{1B}n_2 + g_{12}\Gamma)(g_{11}g_{2B} - 2g_{21}g_{1B})] \quad (12)$$

$$C = \frac{g_{2B}(n_1 g_{2B} + g_{21}\Gamma)}{\ln 2} \times [g_{11}g_{2B}n_2(n_2 g_{2B} + g_{22}\Gamma) - g_{22}(g_{1B}n_2 + g_{12}\Gamma)(n_1 g_{2B} + g_{21}\Gamma)] \quad (13)$$

Proof:
Please refer to Appendix II.

Lemma 2 and the equivalence between $\hat{F}(p_1)$ and $F(p_1,p_2)$ imply that the derived extremal points $p_1^{o_1}$, $p_1^{o_2}$, and $p_1^{o_3}$ could also possibly maximize $F(p_1,p_2)$, depending on whether they fall within the line segment of $l_0$ between points $X_0$ and $Y_0$ (i.e.

$$\left[\frac{\Gamma - g_{2B}p_2^{max}}{g_{1B}}, p_1^{max}\right]$$

according to Table 1). Based on this deduction, we define the three new points, bounded by points $X_0$ and $Y_0$, as follows:

$$O_1^{I.1} = \begin{cases} (p_1^{o_1}, f_{l_0}(p_1^{o_1})) & \text{if } (X_0)_h < p_1^{o_1} < (Y_0)_h \\ \phi & \text{otherwise} \end{cases};$$

$$O_2^{I.1} = \begin{cases} (p_1^{o_2}, f_{l_0}(p_1^{o_2})) & \text{if } (X_0)_h < p_1^{o_2} < (Y_0)_h \\ \phi & \text{otherwise} \end{cases};$$

$$O_3^{I.1} = \begin{cases} (p_1^{o_3}, f_{l_0}(p_1^{o_3})) & \text{if } (X_0)_h < p_1^{o_3} < (Y_0)_h \\ \phi & \text{otherwise} \end{cases}.$$

Note that points $X_0$ and $Y_0$ are provided in Table 1, and $p_1^{o_1}$, $p_1^{o_2}$, and $p_1^{o_3}$, are given in Lemma 2.

Using Lemma 1 and Lemma 2, we can derive $(p^*_1, p^*_2)$ of Problem (P1) under Subcase I.1 as follows.

Theorem 1. (Optimal Power Allocation for Subcase I.1): The optimal power allocations $(p^*_1, p^*_2)$ of Problem (P1) under Subcase I.1 are:

$$(p_1^*, p_2^*) = \begin{cases} \arg\max_{(p_1,p_2) \in \{X_0, X_1, Y_0, Y_2, O_1^{I.1}, O_2^{I.1}\}} F(p_1, p_2) & \text{if } A \neq 0, \\ \arg\max_{(p_1,p_2) \in \{X_0, X_1, Y_0, Y_2, O_3^{I.1}\}} F(p_1, p_2) & \text{if } A = 0. \end{cases}$$

Proof:
Please refer to Appendix III.

B.2 Optimal Power Allocations for Subcase I.2

Similar to Subcase I.1, we can also characterize the optimal power allocations of Problem (P1) under Subcase I.2. Specifically, we also define the following three points, which are bounded by points $Z_1$ and $Z_2$:

$$O_1^{I.2} = \begin{cases} (p_1^{o_1}, f_{l_0}(p_1^{o_1})) & \text{if } (Z_1)_h < p_1^{o_1} < (Z_2)_h \\ \phi & \text{otherwise} \end{cases};$$

$$O_2^{I.2} = \begin{cases} (p_1^{o_2}, f_{l_0}(p_1^{o_2})) & \text{if } (Z_1)_h < p_1^{o_2} < (Z_2)_h \\ \phi & \text{otherwise} \end{cases};$$

$$O_3^{I.2} = \begin{cases} (p_1^{o_3}, f_{l_0}(p_1^{o_3})) & \text{if } (Z_1)_h < p_1^{o_3} < (Z_2)_h \\ \phi & \text{otherwise} \end{cases}.$$

Note that $p_1^{o_1}$, $p_1^{o_2}$, and $p_1^{o_3}$ have been given in Lemma 2. However, different from Subcase I.1, Subcase I.2 (as shown in FIG. 2(b)), the line segment $l_0$ is constrained by points $Z_1$ and $Z_2$ (given in Table 1). Hence, the optimal power allocations of Problem (P1) under Subcase I.2 are as follows.

Theorem 2. (Optimal Power Allocation for Subcase I.2): The optimal power allocations $(p^*_1, p^*_2)$ of Problem (P1) under Subcase I.2 are:

$$(p_1^*, p_2^*) = \begin{cases} \arg\max_{(p_1,p_2) \in \{Z_1, Z_2, O_1^{I.2}, O_2^{I.2}\}} F(p_1, p_2) & \text{if } A \neq 0, \\ \arg\max_{(p_1,p_2) \in \{Z_1, Z_2, O_3^{I.2}\}} F(p_1, p_2) & \text{if } A = 0. \end{cases}$$

Proof:
The proof is similar to that for Theorem 1 in Appendix III. It is easy for an ordinary skilled person to develop the proof by reference to Appendix III.

B.3 Optimal Power Allocations for Subcase I.3

Similar to Subcase I.1 and Subcase I.2, we define the following three points, which are bounded by points $X_0$ and $Z_2$ in Subcase I.3:

$$O_1^{I.3} = \begin{cases} (p_1^{o_1}, f_{l_0}(p_1^{o_1})) & \text{if } (X_0)_h < p_1^{o_1} < (Z_2)_h \\ \phi & \text{otherwise} \end{cases};$$

$$O_2^{I.3} = \begin{cases} (p_1^{o_2}, f_{l_0}(p_1^{o_2})) & \text{if } (X_0)_h < p_1^{o_2} < (Z_2)_h \\ \phi & \text{otherwise} \end{cases};$$

$$O_3^{I.3} = \begin{cases} (p_1^{o_3}, f_{l_0}(p_1^{o_3})) & \text{if } (X_0)_h < p_1^{o_3} < (Z_2)_h \\ \phi & \text{otherwise} \end{cases}.$$

Using the above-defined $O_1^{I.3}$, $O_2^{I.3}$, and $O_3^{I.3}$, one can derive the optimal power allocations of Problem (P1) under Subcase I.3 as follows.

Theorem 3. (Optimal Power Allocation for Subcase I.3): The optimal power allocations $(p^*_1, p^*_2)$ of Problem (P1) under Subcase I.3 are:

$$(p_1^*, p_2^*) = \begin{cases} \arg\max_{(p_1,p_2) \in \{X_0, X_1, Z_2, O_1^{I.3}, O_2^{I.3}\}} F(p_1, p_2) & \text{if } A \neq 0, \\ \arg\max_{(p_1,p_2) \in \{X_0, X_1, Z_2, O_3^{I.3}\}} F(p_1, p_2) & \text{if } A = 0. \end{cases}$$

Proof:
The proof is similar to that for Theorem 1 given in Appendix III.

B.4 Optimal Power Allocations for Subcase I.4

Similar to Subcases I.1, I.2, and I.3, we define the following three points, which are now bounded by points $Z_1$ and $Y_0$ in Subcase I.4:

$$O_1^{I.4} = \begin{cases} (p_1^{o_1}, f_{l_0}(p_1^{o_1})) & \text{if } (Z_1)_h < p_1^{o_1} < (Y_0)_h \\ \phi & \text{otherwise} \end{cases};$$

-continued $$O_2^{I.4} = \begin{cases} (p_1^{o_2}, f_{l_0}(p_1^{o_2})) & \text{if } (Z_1)_h < p_1^{o_2} < (Y_0)_h \\ \phi & \text{otherwise} \end{cases};$$

$$O_3^{I.4} = \begin{cases} (p_1^{o_3}, f_{l_0}(p_1^{o_3})) & \text{if } (Z_1)_h < p_1^{o_3} < (Y_0)_h \\ \phi & \text{otherwise} \end{cases}.$$

Using the points $O_1^{I.4}$, $O_2^{I.4}$, and $O_3^{I.4}$ defined above, we provide the following Theorem 4.

Theorem 4. (Optimal Power Allocation for Subcase I.4): The optimal power allocations $(p^*_1, p^*_2)$ of Problem (P1) under Subcase I.4 are:

$$(p_1^*, p_2^*) = \begin{cases} \arg\max_{(p_1,p_2)\in\{Y_0,Y_2,Z_1,O_1^{I.4},O_2^{I.4}\}} F(p_1, p_2) & \text{if } A \neq 0, \\ \arg\max_{(p_1,p_2)\in\{Y_0,Y_2,Z_1,O_3^{I.4}\}} F(p_1, p_2) & \text{if } A = 0. \end{cases}$$

Proof:

The proof is also similar to that for Theorem 1.

Summarizing the above four subcases, we finish deriving the optimal power allocations for Problem (P1) under Case I.

B.5 Optimal Power Allocations for Case II and Case III

We next derive the optimal power allocations under Case II and Case III by using the similar approach as that for Case I, i.e. categorizing different subcases that differentiate the location of $l_0$. In particular, we will show that each subcase of Case II (or Case III) is equivalent to one subcase of Case I, and thus the analytical optimal power allocations provided before in the previous Subsections A, B, C, and D are also applicable to the subcases of Case II and Case III.

Figure 3:
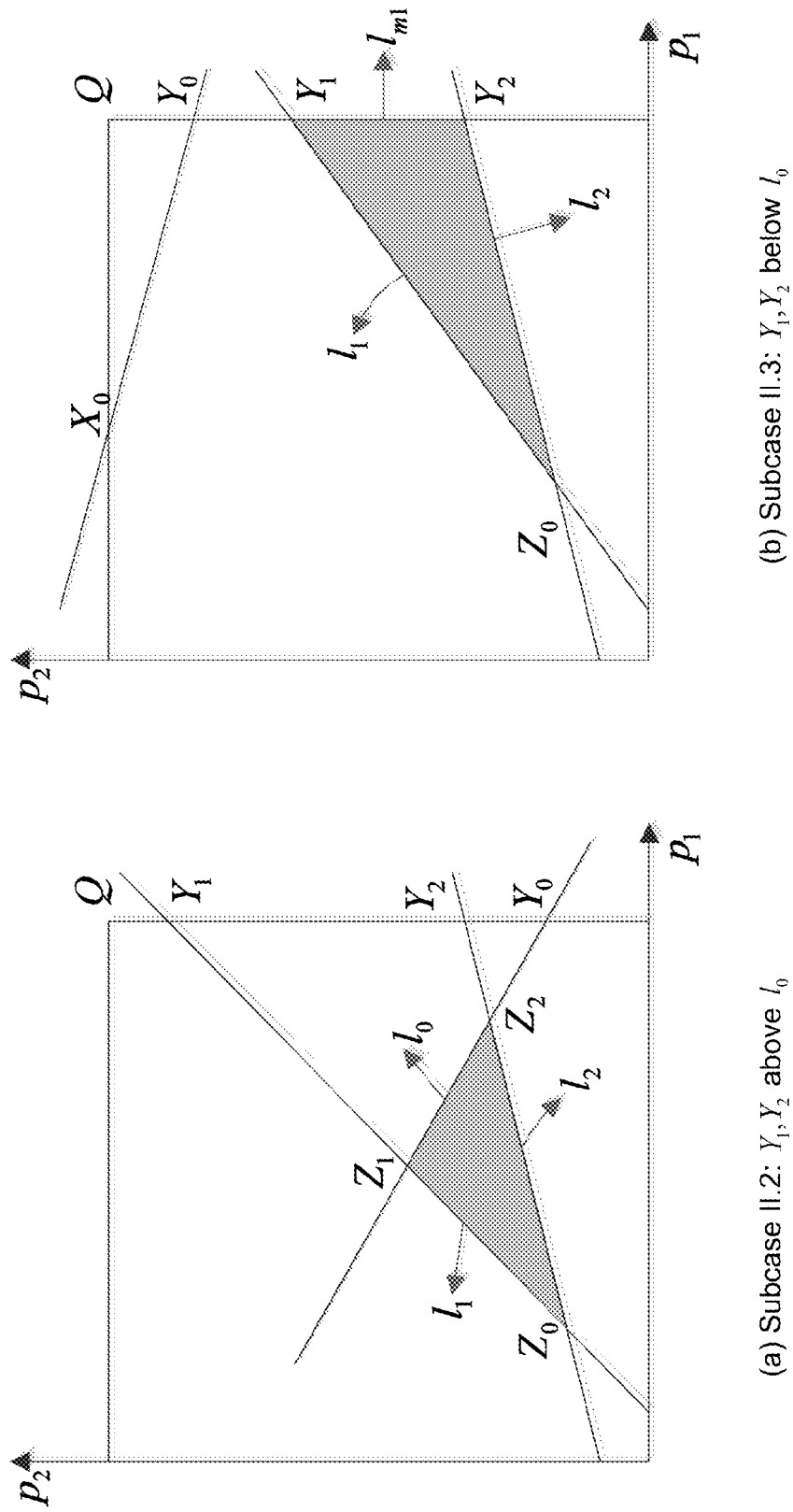
FIG. 3 depicts Subcase II. 2 and Subcase II.3 in Case II according to the different locations of line $l_0$ relative to points $Y_1$ and $Y_2$, whereas Subcase II.1 is given in FIG. 1(b).

Specifically, we first consider Case II, which includes three subcases, i.e. Subcase II.1 as shown in FIG. 1(*b*), Subcase II.2 in FIG. 3(*a*), and Subcase II.3 in FIG. 3(*b*), depending on how line $l_0$ locates with respect to points $Y_1$ and $Y_2$. (Different from that for Case I, the two points $Y_1$ and $Y_2$ in Case II have the same horizontal-coordinate, and thus there only exist three instead of four subcases in Case II.) In particular, a deep look at Subcase II.1 shows that it is in fact similar to Subcase I.4 (as shown in FIG. 2(*d*)), and the optimal power allocations in Theorem 4 is applicable. Subcase II.2 is similar to Subcase I.2 (in FIG. 2(*b*)), and thus the optimal power allocations in Theorem 2 is applicable. Finally, the optimal power allocations under Subcase II.3 are given by $(p^*_1, p^*_2) = \arg\max_{(p_1,p_2)\in\{Y_1,Y_2\}} F(p_1,p_2)$ according to Lemma 1. We thus finish deriving the optimal power allocations for Case II.

The results for Case II are as follows.

Subcase II.1: $f_{l_0}((Y_1)_h) \geq (Y_1)_v$ and $f_{l_0}((Y_2)_h) \leq (Y_2)_v$, meaning that point $Y_1$ is above line $l_0$ and point $Y_2 Y_2$ is below $l_0$. The optimal power allocation for this subcase is completely similar to Theorem 4. (Notice that all of the points used therein are provided in Table I.)

Subcase II.2: $f_{l_0}((Y_1)_h) \geq (Y_1)_v$ and $f_{l_0}((Y_2)_h) \geq (Y_2)_v$, meaning that points $Y_1$ and $Y_2$ are both above line $l_0$. The optimal power allocation for this subcase is completely similar to Theorem 2.

Subcase II.3: $f_{l_0}((Y_1)_h) \geq (Y_1)_v$ and $f_{l_0}((Y_2)_h) \geq (Y_2)_v$, meaning that points $Y_1$ and $Y_2$ are both below line $l_0$. The optimal power allocation for this subcase is given by Theorem 5 below.

Theorem 5. (Optimal Power Allocation for Subcase II.3): The optimal power allocations $(p^*_1, p^*_2)$ of Problem (P1) under Subcase II.3 are:

$$(p_1^*, p_2^*) = \arg\max_{(p_1,p_2)\in[Y_1,Y_2]} F(p_1, p_2).$$

Using the same approach as for Case II, an ordinary person skilled in the art can also derive the optimal power allocations for Case III (which in fact also has three different subcases). The results for Case III are as follows.

Subcase III.1: $f_{l_0}((X_1)_h) \geq (X_1)_v$ and $f_{l_0}((X_2)_h) \leq (X_2)_v$, meaning that point $X_1$ is below line $l_0$ and point $X_2$ is above $l_0$. The optimal power allocation for this subcase is completely similar to Theorem 3.

Subcase III.2: $f_{l_0}((X_1)_h) \leq (X_1)_v$ and $f_{l_0}((X_2)_h) \leq (X_2)_v$, meaning that points $X_1$ and $X_2$ are both above line $l_0$. The optimal power allocation for this subcase is completely similar to Theorem 2.

Subcase III.3: $f_{l_0}((X_1)_h) \geq (X_1)_v$ and $f_{l_0}((X_2)_h) \geq (X_2)_v$, meaning that points $X_1$ and $X_2$ are both below line $l_0$. The optimal power allocation for this subcase is given by Theorem 6 below.

Theorem 6. (Optimal Power Allocation for Subcase III.3): The optimal power allocations $(p^*_1, p^*_2)$ of Problem (P1) under Subcase III.3 are:

$$(p_1^*, p_2^*) = \arg\max_{(p_1,p_2)\in[X_1,X_2]} F(p_1, p_2).$$

B.6 Appendix I: Proof of Lemma 1

The proof is similar to that in [4], which considered the feasible region comprising each user's peak transmit power constraint, but without considering the PU's interference limit constraint (represented by line segment $l_0$ between points $X_0$ and $Y_0$ as shown in FIG. 2(*a*)). Thus, using the similar technique as in [4], we can prove that $X_0$, $X_1$, $Y_0$, and $Y_2$ are the candidates for the optimal power allocations of Problem (P1). Moreover, since (i) for some $\lambda > 1$, there exists $$F(\lambda p_1, \lambda p_2) = \log_2\left(1 + \frac{\lambda g_{11} p_1}{n_1 + \lambda g_{21} p_2}\right) + \log_2\left(1 + \frac{\lambda g_{22} p_2}{n_2 + \lambda g_{12} p_1}\right)$$

$$= \log_2\left(1 + \frac{g_{11} p_1}{\frac{n_1}{\lambda} + g_{21} p_2}\right) +$$

$$\log_2\left(1 + \frac{g_{22} p_2}{\frac{n_2}{\lambda} + g_{12} p_1}\right) > F(p_1, p_2),$$

i.e. the total throughput of the two SUs increases when the power allocation pair $(p_1, p_2)$ increases, and (ii) $p_1$ and $p_2$ are coupled by function $g_{1B} p_1 + g_{2B} p_2 = \Gamma$ on line $l_0$. Therefore, the points on the line segment of $l_0$ between $X_0$ and $Y_0$ are also the possible candidates for the optimal power allocations.

Thus, the optimal power allocations of Problem (P1) under Subcase I.1 must reside within the vertices $X_0$, $X_1$, $Y_0$, and $Y_2$, or on the line segment of $l_0$ between points $X_0$ and $Y_0$.

B.7 Appendix II: Proof of Lemma 2

To derive the possible extremal points on line segment $l_0$ between points $X_0$ and $Y_0$, we calculate the first order derivative of $\hat{F}(p_1)$ as follows:

$$\frac{d\hat{F}(p_1)}{dp_1} = \frac{Ap_1^2 + Bp_1 + C}{D},$$

where parameters A, B, and C have given in (11), (12) and (13), respectively. Meanwhile, D is given by:

$$D=(n_1g_{2B}+g_{21}\Gamma+g_{11}g_{2B}p_1-g_{21}g_{1B}p_1)\times(n_1g_{2B}+g_{21}\Gamma-g_{21}g_{1B}p_1)\times(n_2g_{2B}+g_{22}\Gamma+g_{12}g_{2B}p_1-g_{22}g_{1B}p_1)\times(n_2g_{2B}+g_{12}g_{2B}p_1).$$

In particular, $D>0$ always holds, since the four items (in the product form) in D correspond to the numerators and denominators in the $\log(\cdot)$ expression in (10). By imposing $$\frac{d\hat{F}(p_1)}{dp_1} = 0,$$

we obtain a quadratic equation $Ap_1^2+Bp_1+C=0$, whose roots can be analytically given by $$p_1^{o_1} = \frac{-B+\sqrt{B^2-4AC}}{2A}, \text{ and } p_1^{o_2} = \frac{-B-\sqrt{B^2-4AC}}{2A}, \text{ if } A \neq 0;$$

$$p_1^{o_3} = -\frac{C}{B}, \text{ if } A = 0,$$

which correspond to the extremal points on line segment $l_0$ that might maximize $\hat{F}(p_1)$ (or equivalently, $F(p_1,p_2)$).

B.8 Appendix III: Proof of Theorem 3

For the case of $A \neq 0$, there exist two extremal points $O_1^{I.1}=(p_1^{o_1}, f_{l_0}(p_1^{o_1}))$, $O_2^{I.1}=(p_1^{o_2}, f_{l_0}(p_1^{o_2}))$ on the line segment of $l_0$ according to Lemma 2. In companion with the previous four points $X_0, X_1, Y_0,$ and $Y_2$ (which have been proved in Lemma 1), the optimal power allocations $(p^*_1, p^*_2)$ of Problem (P1) under Subcase I.1 can thus be given by $$(p_1^*, p_2^*) = \arg\max_{(p_1,p_2) \in \{X_0,X_1,Y_0,Y_2,O_1^{I.1},O_2^{I.1}\}} F(p_1, p_2).$$

Similarly, for the case of $A=0$, there exists one extremal point $O_3^{I.1}=(p_1^{o_3}, f_{l_0}(p_1^{o_3}))$ on the line segment of $l_0$. Again, in companion with the previous four points $X_0, X_1, Y_0,$ and $Y_2$, the optimal power allocations $(p^*_1, p^*_2)$ under Subcase I.1 can thus be given by $$(p_1^*, p_2^*) = \arg\max_{(p_1,p_2) \in \{X_0,X_1,Y_0,Y_2,O_3^{I.1}\}} F(p_1, p_2).$$

C. Numerical Results

In this section, we perform numerical simulations to validate our analytical results in Theorems 1, 2, 3, and 4. In particular, we focus on presenting the results that the optimal power allocations $(p^*_1, p^*_2)$ occur on line $l_0$ when the PU's interference limit is binding. That is, one of the extremal points given in Lemma 2 turns out to be the optimal power allocations, which is a key advance we have made in this work in comparison with the previous ones. We set the background noise $n_i=0.01$ W and set the SUs' maximum transmit powers $p_1^{max}=1.0$ W and $p_2^{max}=1.5$ W.

Figure 4:
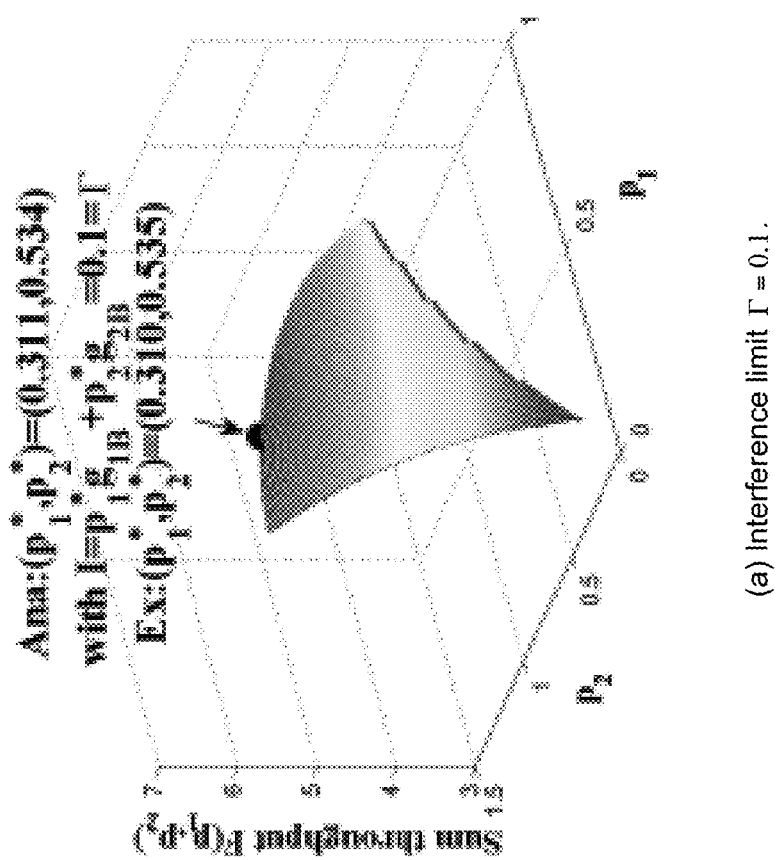
FIG. 4 depicts sum throughput $F(p_1,p_2)$ with different interference limits (i.e., $\Gamma$) of the PU for the case of $A \neq 0$, where the channel power gains are $g_{11}=0.2$, $g_{22}=0.4$, $g_{12}=g_{21}=0.01$, $g_{1B}=0.15$ and $g_{2B}=0.1$, and the SUs' minimum SINR requirements are $\gamma_1=\gamma_2=2$.
Figure 4:
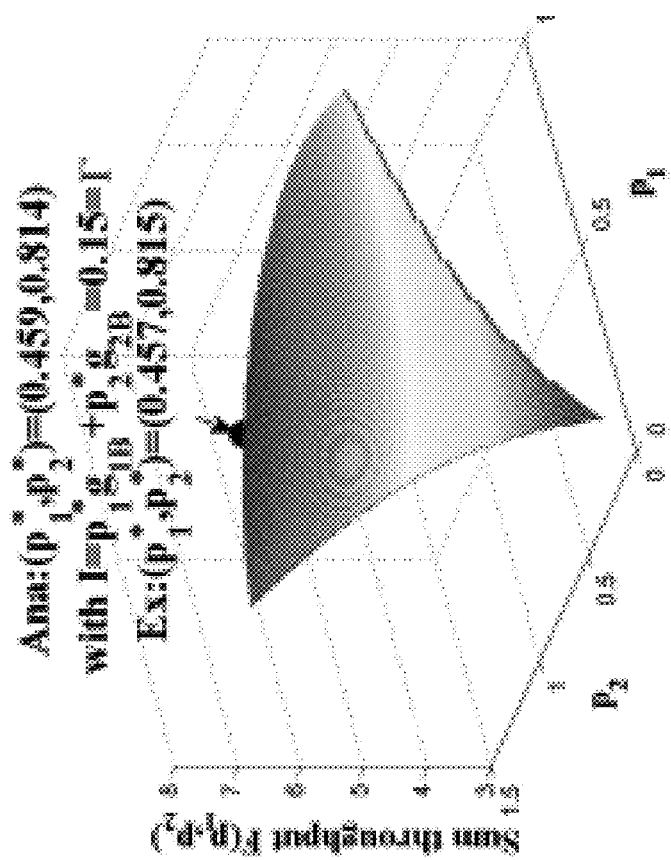
Figure 4:
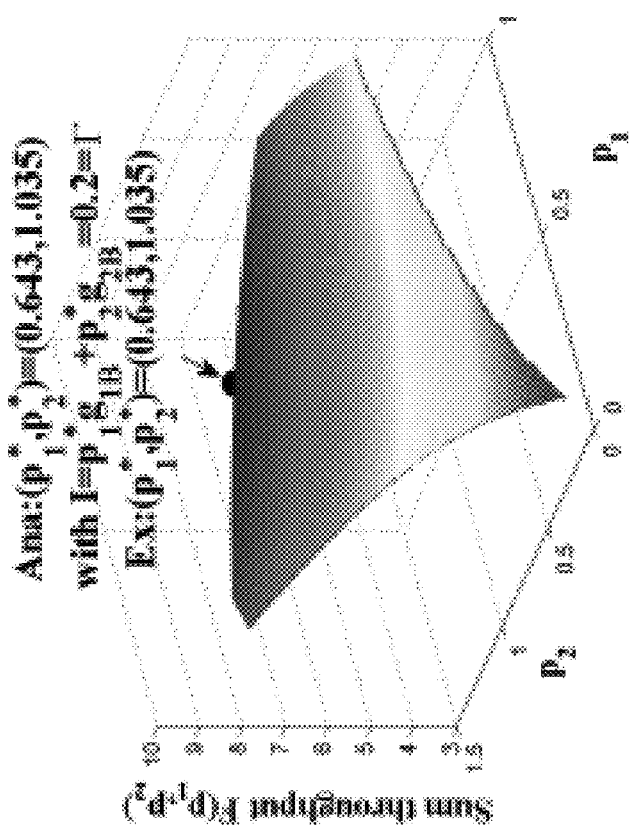

FIG. 4 shows the values of $F(p_1,p_2)$ by enumerating different $(p_1,p_2)$ for three cases of the PU's interference limit $\Gamma$ (i.e., $\Gamma=0.1, 0.15,$ and $0.2$). In this figure, we set $g_{11}=0.2$, $g_{22}=0.4$, $g_{12}=g_{21}=0.01$, $g_{1B}=0.15$, $g_{2B}=0.1$, and $\gamma_1=\gamma_2=2$, which yield $A \neq 0$ according to (11). In each subfigure thereof, we mark out the optimal power allocations $(p^*_1, p^*_2)$ (denoted by "Ana:"), which are analytically derived according to one of Theorems 1, 2, 3, and 4. In particular, only one theorem is applicable to derive $(p^*_1, p^*_2)$, depending on which of the specific cases (i.e. Subcases I.1, I.2, I.3, and I.4) occurs. For instance, Subcase I.2 occurs in FIG. 3(a), and we thus use Theorem 2 to derive $(p^*_1, p^*_2)$ accordingly. To validate this result, we also use exhaustive search to find the optimal power allocations (in a brute-force manner) and mark out the corresponding result which is denoted by "Ex:". The comparisons between the two sets of the results show that the analytically derived $(p^*_1, p^*_2)$ match those obtained by exhaustive search very well, thus validating Theorems 1, 2, 3, and 4. Besides, in each subfigure, we also mark out the SUs' total interference, i.e. $l=p^*_1g_{1B}+p^*_2g_{2B}$, which matches with $\Gamma$ well, meaning that the optimal power allocations $(p^*_1, p^*_2)$ indeed occur on line $l_0$ (i.e., the PU's interference limit constraint is strictly binding). Moreover, the comparisons among the three subfigures show that when the PU's interference limit increases, the optimal power allocations $(p^*_1, p^*_2)$ increase accordingly. That is, the SUs are able to transmit more aggressively and achieve a higher throughput.

Figure 5:
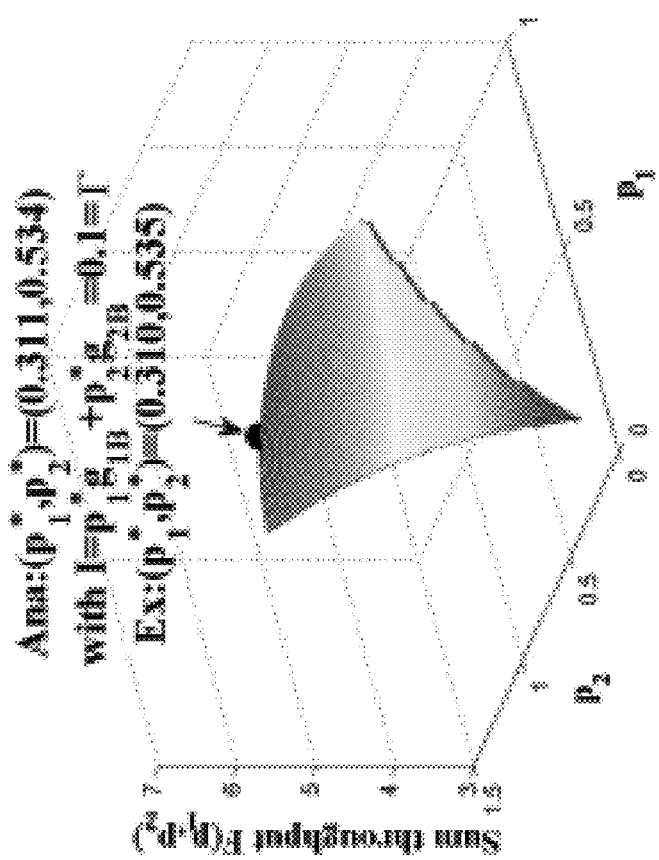
FIG. 5 depicts sum throughput $F(p_1,p_2)$ with different levels of cross interference (i.e., $g_{12}$ and $g_{21}$) for the case of $A \neq 0$, where the rest of the channel gains are $g_{11}=0.2$, $g_{22}=0.4$, $g_{1B}=0.15$ and $g_{2B}=0.1$, and the SUs' minimum SINR requirements are $\gamma_1=\gamma_2=2$. The PU's interference limit is $\Gamma=0.1$.
Figure 5:
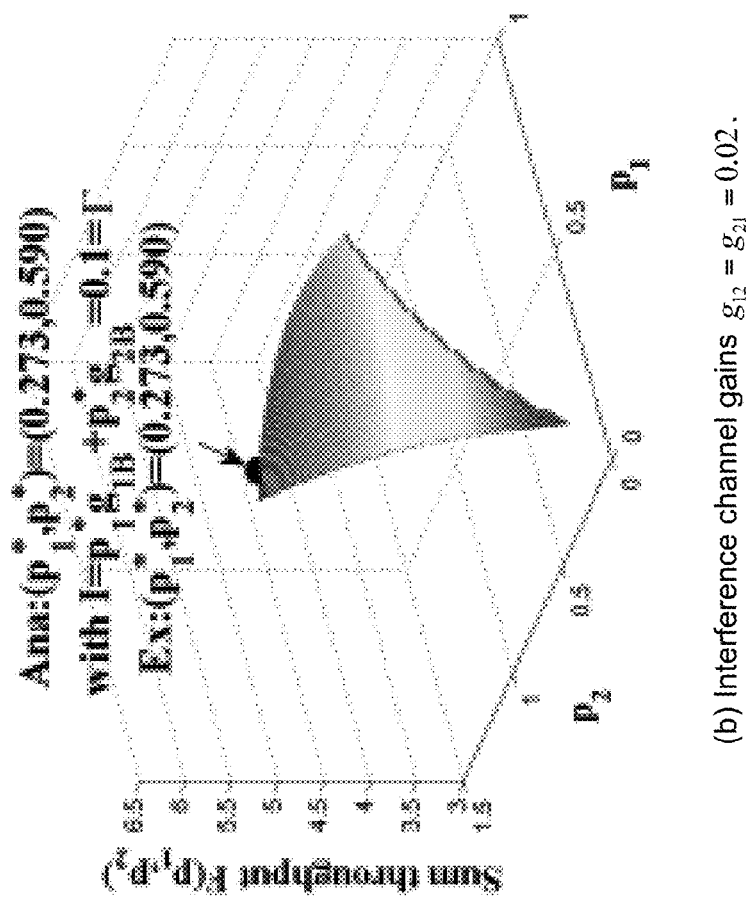
Figure 5:
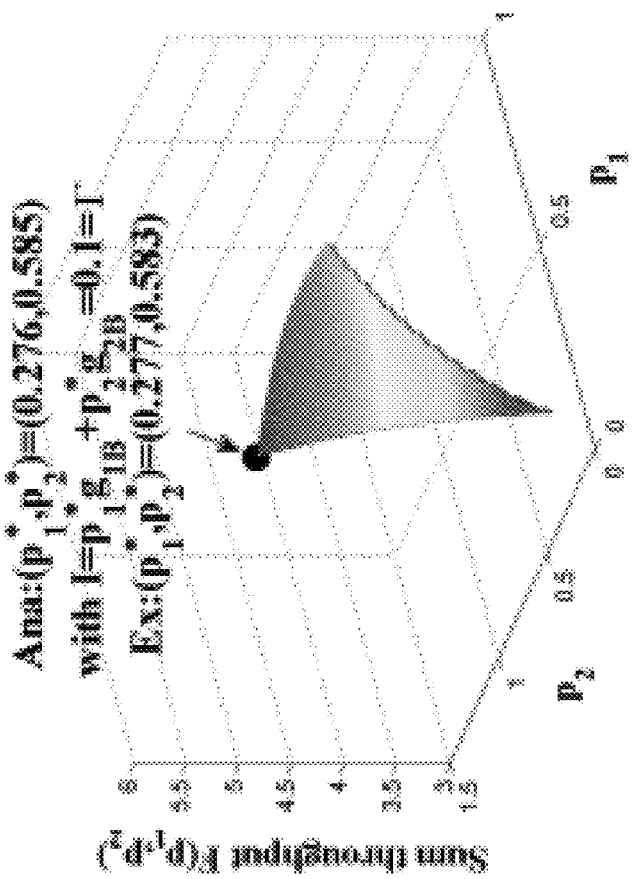
Figure 6:
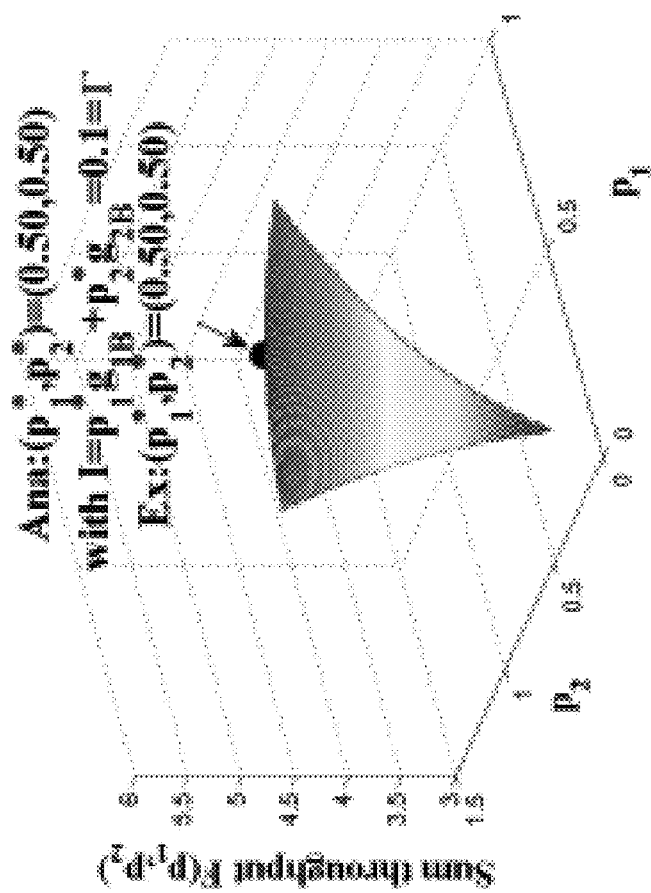
FIG. 6 depicts sum throughput $F(p_1,p_2)$ with different interference limits (i.e. $\Gamma$) of the PU for the case of $A=0$, where the channel power gains are $g_{11}=g_{22}=0.2$, $g_{12}=g_{21}=0.02$ and $g_{1B}=g_{2B}=0.1$. the SUs' minimum SINR requirements are $\gamma_1=\gamma_2=2$.
Figure 6:
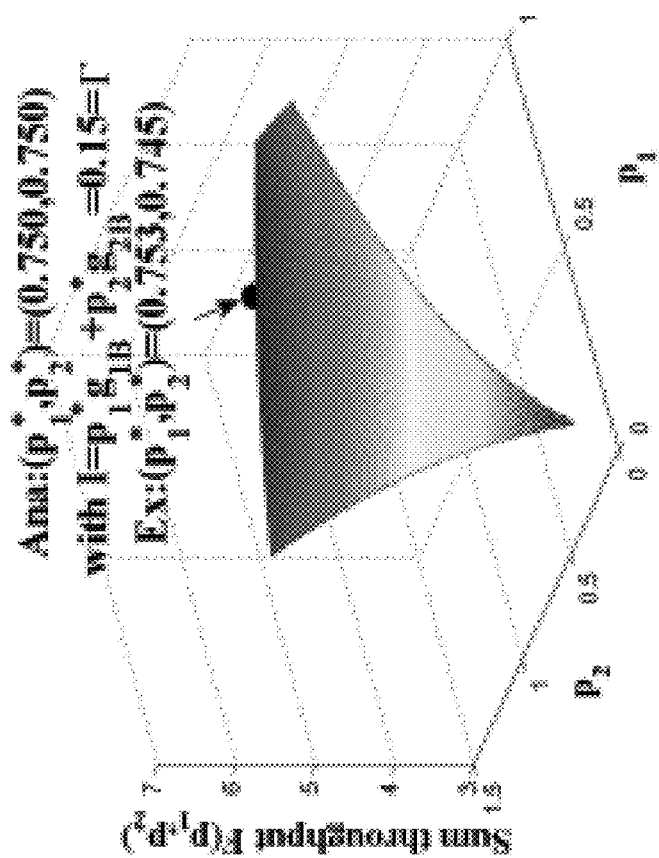
Figure 6:
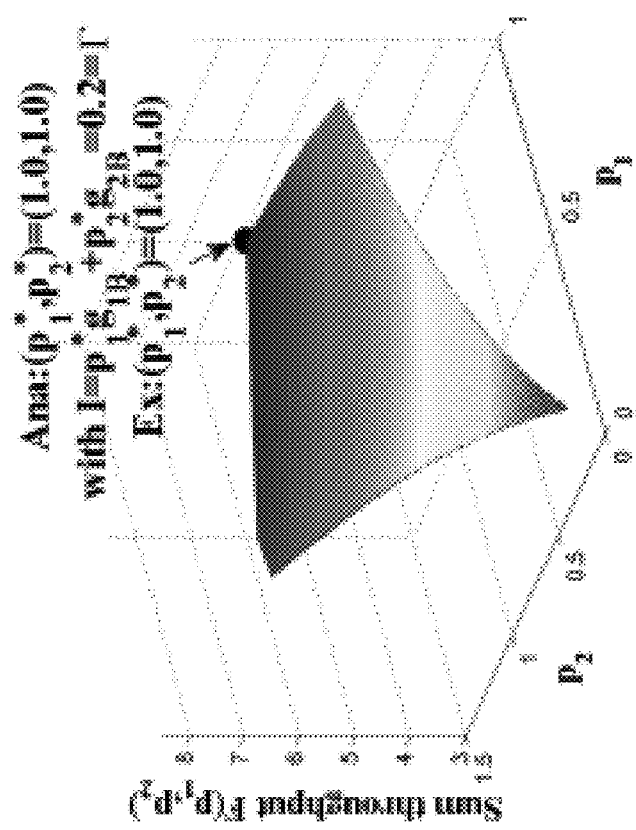

FIG. 5 shows $F(p_1,p_2)$ with different levels of the cross interference (i.e. $g_{12}=g_{21}=0.01, 0.02$ and $0.03$ in the three subfigures, respectively). Here, we set $g_{11}=0.2$, $g_{22}=0.4$, $g_{1B}=0.15$, $g_{2B}=0.1$, $mma_1=\gamma_2=2$, and $\Gamma=0.1$, which again yield $A \neq 0$ according to (11). Similar to FIG. 1, the analytically derived optimal power allocations $(p^*_1, p^*_2)$ based on Theorems 1, 2, 3, and 4 match those obtained by exhaustive search very well. Besides, the optimal power allocations $(p^*_1, p^*_2)$ indeed occur when the PU's interference limit constraint is binding. In particular, the comparison among the three subfigures shows that when the cross interference is weak, both SUs can transmit simultaneously (i.e. sharing the PU's spectrum) for maximizing their total throughput. In comparison, when the cross interference becomes greater, only one favorable SU will be selected to transmit (to avoid excessive interference between the SUs) for maximizing their total throughput. This in fact turns back to the results in the previous work. That is, the optimal power allocations occur on one of the vertices of the feasible region.

Finally, FIG. 1 also shows $F(p_1,p_2)$ for the case of $A=0$ (in particular, we set a symmetric case that $g_{11}=g_{22}=0.2$, $g_{12}=g_{21}=0.02$, $g_{1B}=g_{2B}=0.1$, and $\gamma_1=\gamma_2=2$, which yield $A=0$ according to (11)). We also vary $\Gamma=0.1, 0.15,$ and $0.2$ in the three subfigures. Again, in all the tested cases, the analytically-derived optimal power allocations match those obtained by exhaustive search, thus validating Theorems 1, 2, 3, and 4 for the case of $A=0$.

D. The Present Invention

The present invention is developed based on the optimal power allocation scheme as disclosed above.

An aspect of the present invention is to provide a method of power control for a plurality of SUs in a cognitive radio network having a plurality of PUs. In the method, an optimal power level for each of the SUs is determined such that a total throughput of all the SUs is maximized while satisfying an individual throughput requirement of each SU and an interference limit constraint of the PUs.

In one embodiment, the number of SUs is two, and the optimal power level for each of the SUs is determined by maximizing a two-user throughput as defined in P1 subject to constraints given by (1)-(4).

Preferably, the maximizing of the two-user throughput comprises determining feasibility of maximizing the throughput under the constraints by checking if (9) is met.

It is also preferable that the maximizing of the two-user throughput further comprises the following steps. First, lines according to (5)-(8) are constructed. If the feasibility of maximizing the throughput is confirmed, a feasible region being enclosed by the constructed lines is identified. Then coordinates of critical points, as mentioned above and shown in Table I, are determined such that the optimal power level for each of the SUs is determined according to the coordinates of the critical points.

Advantageously, the two-user throughput is maximized according to Theorems 1-6 for Subcases I.1-4, Subcases II.1-3 and Subcases III.1-3.

The embodiments disclosed herein may be implemented using general purpose or specialized computing devices, computer processors, or electronic circuitries including but not limited to digital signal processors, application specific integrated circuits, field programmable gate arrays, and other programmable logic devices configured or programmed according to the teachings of the present disclosure. Computer instructions or software codes running in the general purpose or specialized computing devices, computer processors, or programmable logic devices can readily be prepared by practitioners skilled in the software or electronic art based on the teachings of the present disclosure.

The present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A method of power control for two secondary users (SUs) in a cognitive radio network having a plurality of primary users (PUs), the method comprising:
    determining an optimal power level for each of the two SUs such that a total throughput of the two SUs is maximized while satisfying an individual throughput requirement of each SU and an interference limit constraint of the PUs;
    wherein the optimal power level for each of the two SUs is determined by maximizing a two-user throughput of $$\max F(p_1, p_2) = W\log_2\left(1 + \frac{p_1 g_{11}}{n_1 + p_2 g_{21}}\right) + W\log_2\left(1 + \frac{p_2 g_{22}}{n_2 + p_1 g_{12}}\right)$$

subject to constraints:

$$p_1 g_{1B} + p_2 g_{2B} \leq \Gamma;$$

$$\frac{p_1 g_{11}}{n_1 + p_2 g_{21}} \geq \gamma_1;$$

$$\frac{p_2 g_{22}}{n_2 + p_1 g_{12}} \geq \gamma_2; \text{ and}$$

$$0 \leq p_1 \leq p_1^{max} \text{ and } 0 \leq p_2 \leq p_2^{max};$$

where:
    $p_i$ denotes the transmit power of SU i;
    $g_{ii}$ denotes a channel power gain from a transmitter of SU i to its receiver;
    $g_{ij}$ denotes a channel power gain from the transmitter of SU i to a receiver of SU j;
    $g_{iB}$ denotes a channel power gain from the transmitter of SU i to a base station (BS);
    $n_i$ denotes the power of background noise experienced by the receiver of SU i;
    $p_i^{max}$ denotes the upper bound that each SU i's transmit power cannot exceed;
    $\Gamma$ is an interference limit of each of the PUs; and
    $\gamma_i$ is a signal to interference plus noise ratio required to achieve the individual throughput requirement of SU i.

2. The method of claim 1, wherein the maximizing of the two-user throughput comprises:
    determining feasibility of maximizing the throughput under the constraints by checking if a condition $g_{11}g_{22} - \gamma_1\gamma_2 g_{12}g_{21} > 0$ is met.

3. The method of claim 2, wherein the maximizing of the two-user throughput further comprises:
    constructing lines:

$$\text{Line } l_0: p_2 = f_{l_0}(p_1) = -\frac{g_{1B}}{g_{2B}}p_1 + \frac{\Gamma}{g_{2B}};$$

$$\text{Line } l_1: p_2 = f_{l_1}(p_1) = -\frac{g_{11}}{\gamma_1 g_{21}}p_1 - \frac{n_1}{g_{21}};$$

$$\text{Line } l_2: p_2 = f_{l_2}(p_1) = \frac{\gamma_2 g_{12}}{g_{22}}p_1 + \frac{\gamma_2 n_2}{g_{22}};$$

$$\text{Line } l_{m1}: p_1 = p_1^{max}; \text{ and}$$

$$\text{Line } l_{m2}: p_2 = p_2^{max};$$

when the feasibility of maximizing the throughput is confirmed, identifying a feasible region being enclosed by the constructed lines; and determining coordinates of critical points such that the optimal power level for each of the SUs is determined according to the coordinates of the critical points.

4. The method according to claim 3, wherein the maximizing of the two-user throughput further comprises:
    when $f_{l_0}((X_1)_h) \geq (X_1)_v$ and $f_{l_0}((Y_2)_h) \geq (Y_2)_v$, computing the optimal power levels of SU 1 and SU 2, respectively denoted as $p^*_1$ and $p^*_2$, for maximizing the two-user throughput by $$(p_1^*, p_2^*) = \begin{cases} \arg\max_{(p_1,p_2)\in\{X_0,X_1,Y_0,Y_2,O_1^{I,1},O_2^{I,1}\}} F(p_1, p_2) & \text{if } A \neq 0, \\ \arg\max_{(p_1,p_2)\in\{X_0,X_1,Y_0,Y_2,O_3^{I,1}\}} F(p_1, p_2) & \text{if } A = 0 \end{cases};$$

where:

$$X_0 = \left(\frac{\Gamma - g_{2B}p_2^{max}}{g_{1B}}, p_2^{max}\right) \text{ and } X_0 = ((X_0)_h, (X_0)_v);$$

-continued $$X_1 = \left(\frac{\gamma_1 n_1 + g_{21}\gamma_1 p_2^{max}}{g_{11}}, p_2^{max}\right) \text{ and } X_1 = ((X_1)_h, (X_1)_v);$$

$$Y_0 = \left(p_1^{max}, \frac{\Gamma - g_{1B}p_1^{max}}{g_{2B}}\right) \text{ and } Y_0 = ((Y_0)_h, (Y_0)_v);$$

$$Y_2 = \left(p_1^{max}, \frac{n_2\gamma_2 + g_{12}\gamma_2 p_1^{max}}{g_{22}}\right) \text{ and } Y_2 = ((Y_2)_h, (Y_2)_v);$$

$$O_1^{l,1} = \begin{cases} (p_1^{o1}, f_{l_0}(p_1^{o1})) & \text{if } (X_0)_h < p_1^{o1} < (Y_0)_h \\ \phi & \text{otherwise} \end{cases};$$

$$O_2^{l,1} = \begin{cases} (p_1^{o2}, f_{l_0}(p_1^{o2})) & \text{if } (X_0)_h < p_1^{o2} < (Y_0)_h \\ \phi & \text{otherwise} \end{cases};$$

$$O_3^{l,1} = \begin{cases} (p_1^{o3}, f_{l_0}(p_1^{o3})) & \text{if } (X_0)_h < p_1^{o3} < (Y_0)_h \\ \phi & \text{otherwise} \end{cases};$$

$$p_1^{o1} = \frac{-B + \sqrt{B^2 - 4AC}}{2A} \text{ if } A \neq 0;$$

$$p_1^{o2} = \frac{-B - \sqrt{B^2 - 4AC}}{2A} \text{ if } A \neq 0;$$

$$p_1^{o3} = \frac{-C}{B} \text{ if } A = 0;$$

$$A = \frac{g_{2B}}{\ln 2}[g_{11}g_{12}g_{2B}(n_1g_{2B} + g_{21}\Gamma)(g_{12}g_{2B} - g_{22}g_{1B}) -$$
$$g_{22}g_{21}g_{1B}(g_{1B}n_2 + g_{12}\Gamma)(g_{21}g_{1B} - g_{11}g_{2B})];$$

$$B = \frac{g_{2B}(n_1g_{2B} + g_{21}\Gamma)}{\ln 2} \times [g_{11}g_{2B}(2g_{12}g_{2B}n_2 + g_{12}g_{22}\Gamma - g_{22}g_{1B}n_2) -$$
$$g_{22}(g_{1B}n_2 + g_{12}\Gamma)(g_{11}g_{2B} - 2g_{21}g_{1B})];$$

$$C = \frac{g_{2B}(n_1g_{2B} + g_{21}\Gamma)}{\ln 2} \times [g_{11}g_{2B}n_2(n_2g_{2B} + g_{22}\Gamma) -$$
$$g_{22}(g_{1B}n_2 + g_{12}\Gamma)(n_1g_{2B} + g_{21}\Gamma)].$$

5. The method according to claim 3, wherein the maximizing of the two-user throughput further comprises:

when $f_{l_0}((X_1)_h) \leq (X_1)_v$ and $f_{l_0}((Y_2)_h) \leq (Y_2)_v$, computing the optimal power levels of SU 1 and SU 2, respectively denoted as p*$_1$ and p*$_2$, for maximizing the two-user throughput by $$(p_1^*, p_2^*) = \begin{cases} \arg\max_{(p_1,p_2) \in \{Z_1, Z_2, O_1^{l,2}, O_2^{l,2}\}} F(p_1, p_2) & \text{if } A \neq 0, \\ \arg\max_{(p_1,p_2) \in \{Z_1, Z_2, O_3^{l,2}\}} F(p_1, p_2) & \text{if } A = 0 \end{cases};$$

where:

$$X_1 = \left(\frac{\gamma_1 n_1 + g_{21}\gamma_1 p_2^{max}}{g_{11}}, p_2^{max}\right) \text{ and } X_1 = ((X_1)_h, (X_1)_v);$$

$$Y_2 = \left(p_1^{max}, \frac{n_2\gamma_2 + g_{12}\gamma_2 p_1^{max}}{g_{22}}\right) \text{ and } Y_2 = ((Y_2)_h, (Y_2)_v);$$

$$Z_1 = \left(\frac{g_{21}\gamma_1\Gamma + g_{2B}n_1\gamma_1}{g_{11}g_{2B} + g_{1B}g_{21}\gamma_1}, \frac{g_{11}\Gamma - g_{1B}n_1\gamma_1}{g_{11}g_{2B} + g_{1B}g_{21}\gamma_1}\right)$$

and $Z_1 = ((Z_1)_h, (Z_1)_v);$ $$Z_2 = \left(\frac{g_{22}\Gamma - g_{2B}n_2\gamma_2}{g_{22}g_{1B} + g_{12}g_{12}\gamma_2}, \frac{g_{12}\gamma_2\Gamma + g_{1B}n_2\gamma_2}{g_{22}g_{1B} + g_{2B}g_{12}\gamma_2}\right)$$

and $Z_2 = ((Z_2)_h, (Z_2)_v);$ $$O_1^{l,2} = \begin{cases} (p_1^{o1}, f_{l_0}(p_1^{o1})) & \text{if } (Z_1)_h < p_1^{o1} < (Z_2)_h \\ \phi & \text{otherwise} \end{cases};$$

$$O_2^{l,2} = \begin{cases} (p_1^{o2}, f_{l_0}(p_1^{o2})) & \text{if } (Z_1)_h < p_1^{o2} < (Z_2)_h \\ \phi & \text{otherwise} \end{cases};$$

$$O_3^{l,2} = \begin{cases} (p_1^{o3}, f_{l_0}(p_1^{o3})) & \text{if } (Z_1)_h < p_1^{o3} < (Z_2)_h \\ \phi & \text{otherwise} \end{cases};$$

$$p_1^{o1} = \frac{-B + \sqrt{B^2 - 4AC}}{2A} \text{ if } A \neq 0;$$

$$p_1^{o2} = \frac{-B - \sqrt{B^2 - 4AC}}{2A} \text{ if } A \neq 0;$$

$$p_1^{o3} = \frac{-C}{B} \text{ if } A = 0;$$

$$A = \frac{g_{2B}}{\ln 2}[g_{11}g_{12}g_{2B}(n_1g_{2B} + g_{21}\Gamma)(g_{12}g_{2B} - g_{22}g_{1B}) -$$
$$g_{22}g_{21}g_{1B}(g_{1B}n_2 + g_{12}\Gamma)(g_{21}g_{1B} - g_{11}g_{2B})];$$

$$B = \frac{g_{2B}(n_1g_{2B} + g_{21}\Gamma)}{\ln 2} \times [g_{11}g_{2B}(2g_{12}g_{2B}n_2 + g_{12}g_{22}\Gamma - g_{22}g_{1B}n_2) -$$
$$g_{22}(g_{1B}n_2 + g_{12}\Gamma)(g_{11}g_{2B} - 2g_{21}g_{1B})];$$

$$C = \frac{g_{2B}(n_1g_{2B} + g_{21}\Gamma)}{\ln 2} \times [g_{11}g_{2B}n_2(n_2g_{2B} + g_{22}\Gamma) -$$
$$g_{22}(g_{1B}n_2 + g_{12}\Gamma)(n_1g_{2B} + g_{21}\Gamma)].$$

6. The method according to claim 3, wherein the maximizing of the two-user throughput further comprises:

when $f_{l_0}((X_1)_h) \geq (X_1)_v$ and $f_{l_0}((Y_2)_h) \leq (Y_2)_v$, computing the optimal power levels of SU 1 and SU 2, respectively denoted as p*$_1$ and p*$_2$, for maximizing the two-user throughput by $$(p_1^*, p_2^*) = \begin{cases} \arg\max_{(p_1,p_2) \in \{X_0, X_1, Z_2, O_1^{l,3}, O_2^{l,3}\}} F(p_1, p_2) & \text{if } A \neq 0, \\ \arg\max_{(p_1,p_2) \in \{X_0, X_1, Z_2, O_3^{l,3}\}} F(p_1, p_2) & \text{if } A = 0 \end{cases};$$

where:

$$X_0 = \left(\frac{\Gamma - g_{2B}p_2^{max}}{g_{1B}}, p_2^{max}\right) \text{ and } X_0 = ((X_0)_h, (X_0)_v);$$

$$X_1 = \left(\frac{\gamma_1 n_1 + g_{21}\gamma_1 p_2^{max}}{g_{11}}, p_2^{max}\right) \text{ and } X_1 = ((X_1)_h, (X_1)_v);$$

$$Y_2 = \left(p_1^{max}, \frac{n_2\gamma_2 + g_{12}\gamma_2 p_1^{max}}{g_{22}}\right) \text{ and } Y_2 = ((Y_2)_h, (Y_2)_v);$$

$$Z_2 = \left(\frac{g_{22}\Gamma - g_{2B}n_2\gamma_2}{g_{22}g_{1B} + g_{12}g_{12}\gamma_2}, \frac{g_{12}\gamma_2\Gamma + g_{1B}n_2\gamma_2}{g_{22}g_{1B} + g_{2B}g_{12}\gamma_2}\right)$$

and $Z_2 = ((Z_2)_h, (Z_2)_v);$ $$O_1^{l,3} = \begin{cases} (p_1^{o1}, f_{l_0}(p_1^{o1})) & \text{if } (X_0)_h < p_1^{o1} < (Z_2)_h \\ \phi & \text{otherwise} \end{cases};$$

$$O_2^{l,3} = \begin{cases} (p_1^{o2}, f_{l_0}(p_1^{o2})) & \text{if } (X_0)_h < p_1^{o2} < (Z_2)_h \\ \phi & \text{otherwise} \end{cases};$$

$$O_3^{l,3} = \begin{cases} (p_1^{o3}, f_{l_0}(p_1^{o3})) & \text{if } (X_0)_h < p_1^{o3} < (Z_2)_h \\ \phi & \text{otherwise} \end{cases};$$

$$p_1^{o1} = \frac{-B + \sqrt{B^2 - 4AC}}{2A} \text{ if } A \neq 0;$$

$$p_1^{o2} = \frac{-B - \sqrt{B^2 - 4AC}}{2A} \text{ if } A \neq 0;$$

$$p_1^{o3} = \frac{-C}{B} \text{ if } A = 0;$$

$$A = \frac{g_{2B}}{\ln 2}[g_{11}g_{12}g_{2B}(n_1g_{2B} + g_{21}\Gamma)(g_{12}g_{2B} - g_{22}g_{1B}) -$$
$$g_{22}g_{21}g_{1B}(g_{1B}n_2 + g_{12}\Gamma)(g_{21}g_{1B} - g_{11}g_{2B})];$$

-continued $$B = \frac{g_{2B}(n_1 g_{2B} + g_{21}\Gamma)}{\ln 2} \times [g_{11}g_{2B}(2g_{12}g_{2B}n_2 + g_{12}g_{22}\Gamma - g_{22}g_{1B}n_2) - g_{22}(g_{1B}n_2 + g_{12}\Gamma)(g_{11}g_{2B} - 2g_{21}g_{1B})];$$

$$C = \frac{g_{2B}(n_1 g_{2B} + g_{21}\Gamma)}{\ln 2} \times [g_{11}g_{2B}n_2(n_2 g_{2B} + g_{22}\Gamma) - g_{22}(g_{1B}n_2 + g_{12}\Gamma)(n_1 g_{2B} + g_{21}\Gamma)].$$

7. The method according to claim 3, wherein the maximizing of the two-user throughput further comprises:

when $f_{I_0}((X_1)_h) \leq (X_1)_v$ and $f_{I_0}((Y_2)_h) \geq (Y_2)_v$, computing the optimal power levels of SU 1 and SU 2, respectively denoted as $p^*_1$ and $p^*_2$, for maximizing the two-user throughput by $$(p^*_1, p^*_2) = \begin{cases} \arg\max_{(p_1,p_2) \in \{Y_0, Y_2, O_1^{I,4}, O_2^{I,4}\}} F(p_1, p_2) & \text{if } A \neq 0, \\ \arg\max_{(p_1,p_2) \in \{Y_0, Y_2, O_3^{I,4}\}} F(p_1, p_2) & \text{if } A = 0 \end{cases};$$

where:

$$X_1 = \left(\frac{\gamma_1 n_1 + g_{21}\gamma_1 p_2^{max}}{g_{11}}, p_2^{max}\right) \text{ and } X_1 = ((X_1)_h, (X_1)_v);$$

$$Y_0 = \left(p_1^{max}, \frac{\Gamma - g_{1B}p_1^{max}}{g_{2B}}\right) \text{ and } Y_0 = ((Y_0)_h, (Y_0)_v);$$

$$Y_2 = \left(p_1^{max}, \frac{n_2\gamma_2 + g_{12}\gamma_2 p_1^{max}}{g_{22}}\right) \text{ and } Y_2 = ((Y_2)_h, (Y_2)_v);$$

$$Z_1 = \left(\frac{g_{21}\gamma_1\Gamma + g_{2B}n_1\gamma_1}{g_{11}g_{2B} + g_{1B}g_{21}\gamma_1}, \frac{g_{11}\Gamma - g_{1B}n_1\gamma_1}{g_{11}g_{2B} + g_{1B}g_{21}\gamma_1}\right)$$

and $Z_1 = ((Z_1)_h, (Z_1)_v);$ $$O_1^{I,4} = \begin{cases} (p_1^{o1}, f_{I_0}(p_1^{o1})) & \text{if } (Z_1)_h < p_1^{o1} < (Y_0)_h \\ \phi & \text{otherwise} \end{cases};$$

$$O_2^{I,4} = \begin{cases} (p_1^{o2}, f_{I_0}(p_1^{o2})) & \text{if } (Z_1)_h < p_1^{o2} < (Y_0)_h \\ \phi & \text{otherwise} \end{cases};$$

$$O_3^{I,4} = \begin{cases} (p_1^{o3}, f_{I_0}(p_1^{o3})) & \text{if } (Z_1)_h < p_1^{o3} < (Y_0)_h \\ \phi & \text{otherwise} \end{cases};$$

$$p_1^{o1} = \frac{-B + \sqrt{B^2 - 4AC}}{2A} \text{ if } A \neq 0;$$

$$p_1^{o2} = \frac{-B - \sqrt{B^2 - 4AC}}{2A} \text{ if } A \neq 0;$$

$$p_1^{o3} = \frac{-C}{B} \text{ if } A = 0;$$

$$A = \frac{g_{2B}}{\ln 2}[g_{11}g_{12}g_{2B}(n_1 g_{2B} + g_{21}\Gamma)(g_{12}g_{2B} - g_{22}g_{1B}) - g_{22}g_{21}g_{1B}(g_{1B}n_2 + g_{12}\Gamma)(g_{21}g_{1B} - g_{11}g_{2B})];$$

$$B = \frac{g_{2B}(n_1 g_{2B} + g_{21}\Gamma)}{\ln 2} \times [g_{11}g_{2B}(2g_{12}g_{2B}n_2 + g_{12}g_{22}\Gamma - g_{22}g_{1B}n_2) - g_{22}(g_{1B}n_2 + g_{12}\Gamma)(g_{11}g_{2B} - 2g_{21}g_{1B})];$$

$$C = \frac{g_{2B}(n_1 g_{2B} + g_{21}\Gamma)}{\ln 2} \times [g_{11}g_{2B}n_2(n_2 g_{2B} + g_{22}\Gamma) - g_{22}(g_{1B}n_2 + g_{12}\Gamma)(n_1 g_{2B} + g_{21}\Gamma)].$$

8. The method according to claim 3, wherein the maximizing of the two-user throughput further comprises:

when $f_{I_0}((Y_1)_h) \geq (Y_1)_v$ and $f_{I_0}((Y_2)_h) \leq (Y_2)_v$, computing the optimal power levels of SU 1 and SU 2, respectively denoted as $p^*_1$ and $p^*_2$, for maximizing the two-user throughput by $$(p^*_1, p^*_2) = \begin{cases} \arg\max_{(p_1,p_2) \in \{Y_0, Y_2, Z_1, O_1^{I,4}, O_2^{I,4}\}} F(p_1, p_2) & \text{if } A \neq 0, \\ \arg\max_{(p_1,p_2) \in \{Y_0, Y_2, Z_1, O_3^{I,4}\}} F(p_1, p_2) & \text{if } A = 0 \end{cases};$$

where:

$$Y_0 = \left(p_1^{max}, \frac{\Gamma - g_{1B}p_1^{max}}{g_{2B}}\right) \text{ and } Y_0 = ((Y_0)_h, (Y_0)_v);$$

$$Y_1 = \left(p_1^{max}, \frac{g_{11}p_1^{max} - \gamma_1 n_1}{\gamma_1 g_{21}}\right) \text{ and } Y_1 = ((Y_1)_h, (Y_1)_v);$$

$$Y_2 = \left(p_1^{max}, \frac{n_2\gamma_2 + g_{12}\gamma_2 p_1^{max}}{g_{22}}\right) \text{ and } Y_2 = ((Y_2)_h, (Y_2)_v);$$

$$Z_1 = \left(\frac{g_{21}\gamma_1\Gamma + g_{2B}n_1\gamma_1}{g_{11}g_{2B} + g_{1B}g_{21}\gamma_1}, \frac{g_{11}\Gamma - g_{1B}n_1\gamma_1}{g_{11}g_{2B} + g_{1B}g_{21}\gamma_1}\right)$$

and $Z_1 = ((Z_1)_h, (Z_1)_v);$ $$O_1^{I,4} = \begin{cases} (p_1^{o1}, f_{I_0}(p_1^{o1})) & \text{if } (Z_1)_h < p_1^{o1} < (Y_0)_h \\ \phi & \text{otherwise} \end{cases};$$

$$O_2^{I,4} = \begin{cases} (p_1^{o2}, f_{I_0}(p_1^{o2})) & \text{if } (Z_1)_h < p_1^{o2} < (Y_0)_h \\ \phi & \text{otherwise} \end{cases};$$

$$O_3^{I,4} = \begin{cases} (p_1^{o3}, f_{I_0}(p_1^{o3})) & \text{if } (Z_1)_h < p_1^{o3} < (Y_0)_h \\ \phi & \text{otherwise} \end{cases};$$

$$p_1^{o1} = \frac{-B + \sqrt{B^2 - 4AC}}{2A} \text{ if } A \neq 0;$$

$$p_1^{o2} = \frac{-B - \sqrt{B^2 - 4AC}}{2A} \text{ if } A \neq 0;$$

$$p_1^{o3} = \frac{-C}{B} \text{ if } A = 0;$$

$$A = \frac{g_{2B}}{\ln 2}[g_{11}g_{12}g_{2B}(n_1 g_{2B} + g_{21}\Gamma)(g_{12}g_{2B} - g_{22}g_{1B}) - g_{22}g_{21}g_{1B}(g_{1B}n_2 + g_{12}\Gamma)(g_{21}g_{1B} - g_{11}g_{2B})];$$

$$B = \frac{g_{2B}(n_1 g_{2B} + g_{21}\Gamma)}{\ln 2} \times [g_{11}g_{2B}(2g_{12}g_{2B}n_2 + g_{12}g_{22}\Gamma - g_{22}g_{1B}n_2) - g_{22}(g_{1B}n_2 + g_{12}\Gamma)(g_{11}g_{2B} - 2g_{21}g_{1B})];$$

$$C = \frac{g_{2B}(n_1 g_{2B} + g_{21}\Gamma)}{\ln 2} \times [g_{11}g_{2B}n_2(n_2 g_{2B} + g_{22}\Gamma) - g_{22}(g_{1B}n_2 + g_{12}\Gamma)(n_1 g_{2B} + g_{21}\Gamma)].$$

9. The method according to claim 3, wherein the maximizing of the two-user throughput further comprises:

when $f_{I_0}((Y_1)_h) \leq (Y_1)_v$ and $f_{I_0}((Y_2)_h) \leq (Y_2)_v$, computing the optimal power levels of SU 1 and SU 2, respectively denoted as $p^*_1$ and $p^*_2$, for maximizing the two-user throughput by $$(p^*_1, p^*_2) = \begin{cases} \arg\max_{(p_1,p_2) \in \{Z_1, Z_2, O_1^{I,2}, O_2^{I,2}\}} F(p_1, p_2) & \text{if } A \neq 0, \\ \arg\max_{(p_1,p_2) \in \{Z_1, Z_2, O_3^{I,2}\}} F(p_1, p_2) & \text{if } A = 0 \end{cases};$$

where:

$$Y_1 = \left(p_1^{max}, \frac{g_{11}p_1^{max} - \gamma_1 n_1}{\gamma_1 g_{21}}\right) \text{ and } Y_1 = ((Y_1)_h, (Y_1)_v);$$

$$Y_2 = \left(p_1^{max}, \frac{n_2\gamma_2 + g_{12}\gamma_2 p_1^{max}}{g_{22}}\right) \text{ and } Y_2 = ((Y_2)_h, (Y_2)_v);$$

$$Z_1 = \left(\frac{g_{21}\gamma_1\Gamma + g_{2B}n_1\gamma_1}{g_{11}g_{2B} + g_{1B}g_{21}\gamma_1}, \frac{g_{11}\Gamma - g_{1B}n_1\gamma_1}{g_{11}g_{2B} + g_{1B}g_{21}\gamma_1}\right)$$

and $Z_1 = ((Z_1)_h, (Z_1)_v);$

-continued $$Z_2 = \left(\frac{g_{22}\Gamma - g_{2B}n_2\gamma_2}{g_{22}g_{1B} + g_{12}g_{12}\gamma_2}, \frac{g_{12}\gamma_2\Gamma + g_{1B}n_2\gamma_2}{g_{22}g_{1B} + g_{2B}g_{12}\gamma_2}\right)$$

and $Z_2 = ((Z_2)_h, (Z_2)_v)$;

$$O_1^{l,2} = \begin{cases} (p_1^{o1}, f_{l_0}(p_1^{o1})) & \text{if } (Z_1)_h < p_1^{o1} < (Z_2)_h \\ \phi & \text{otherwise} \end{cases};$$

$$O_2^{l,2} = \begin{cases} (p_1^{o2}, f_{l_0}(p_1^{o2})) & \text{if } (Z_1)_h < p_1^{o2} < (Z_2)_h \\ \phi & \text{otherwise} \end{cases};$$

$$O_3^{l,2} = \begin{cases} (p_1^{o3}, f_{l_0}(p_1^{o3})) & \text{if } (Z_1)_h < p_1^{o3} < (Z_2)_h \\ \phi & \text{otherwise} \end{cases};$$

$$p_1^{o1} = \frac{-B + \sqrt{B^2 - 4AC}}{2A} \text{ if } A \neq 0;$$

$$p_1^{o2} = \frac{-B - \sqrt{B^2 - 4AC}}{2A} \text{ if } A \neq 0;$$

$$p_1^{o3} = \frac{-C}{B} \text{ if } A = 0;$$

$$A = \frac{g_{2B}}{\ln 2}[g_{11}g_{12}g_{2B}(n_1g_{2B} + g_{21}\Gamma)(g_{12}g_{2B} - g_{22}g_{1B}) - g_{22}g_{21}g_{1B}(g_{1B}n_2 + g_{12}\Gamma)(g_{21}g_{1B} - g_{11}g_{2B})];$$

$$B = \frac{g_{2B}(n_1g_{2B} + g_{21}\Gamma)}{\ln 2} \times [g_{11}g_{2B}(2g_{12}g_{2B}n_2 + g_{12}g_{22}\Gamma - g_{22}g_{1B}n_2) - g_{22}(g_{1B}n_2 + g_{12}\Gamma)(g_{11}g_{2B} - 2g_{21}g_{1B})];$$

$$C = \frac{g_{2B}(n_1g_{2B} + g_{21}\Gamma)}{\ln 2} \times [g_{11}g_{2B}n_2(n_2g_{2B} + g_{22}\Gamma) - g_{22}(g_{1B}n_2 + g_{12}\Gamma)(n_1g_{2B} + g_{21}\Gamma)].$$

10. The method according to claim 3, wherein the maximizing of the two-user throughput further comprises:

when $f_{l_0}((Y_1)_h) \geq (Y_1)_v$ and $f_{l_0}((Y_2)_h) \geq (Y_2)_v$, computing the optimal power levels of SU 1 and SU 2, respectively denoted as $p^*_1$ and $p^*_2$, for maximizing the two-user throughput by $$(p_1^*, p_2^*) = \arg\max_{(p_1,p_2)\in[Y_1,Y_2]} F(p_1, p_2);$$

where:

$$Y_1 = \left(p_1^{max}, \frac{g_{11}p_1^{max} - \gamma_1 n_1}{\gamma_1 g_{21}}\right) \text{ and } Y_1 = ((Y_1)_h, (Y_1)_v);$$

$$Y_2 = \left(p_1^{max}, \frac{n_2\gamma_2 + g_{12}\gamma_2 p_1^{max}}{g_{22}}\right) \text{ and } Y_2 = ((Y_2)_h, (Y_2)_v).$$

11. The method according to claim 3, wherein the maximizing of the two-user throughput further comprises:

when $f_{l_0}((X_1)_h) \geq (X_1)_v$ and $f_{l_0}((X_2)_h) \leq (X_2)_v$, computing the optimal power levels of SU 1 and SU 2, respectively denoted as $p^*_1$ and $p^*_2$, for maximizing the two-user throughput by $$(p_1^*, p_2^*) = \begin{cases} \arg\max_{(p_1,p_2)\in\{X_0,X_1,Z_2,O_1^{l,3},O_2^{l,3}\}} F(p_1, p_2) & \text{if } A \neq 0, \\ \arg\max_{(p_1,p_2)\in\{X_0,X_1,Z_2,O_3^{l,3}\}} F(p_1, p_2) & \text{if } A = 0 \end{cases};$$

where:

$$X_0 = \left(\frac{\Gamma - g_{2B}p_2^{max}}{g_{1B}}, p_2^{max}\right) \text{ and } X_0 = ((X_0)_h, (X_0)_v);$$

-continued $$X_1 = \left(\frac{\gamma_1 n_1 + g_{21}\gamma_1 p_2^{max}}{g_{11}}, p_2^{max}\right) \text{ and } X_1 = ((X_1)_h, (X_1)_v);$$

$$X_2 = \left(\frac{g_{22}p_2^{max} - \gamma_2 n_2}{\gamma_2 g_{12}}, p_2^{max}\right) \text{ and } X_2 = ((X_2)_h, (X_2)_v);$$

$$Z_2 = \left(\frac{g_{22}\Gamma - g_{2B}n_2\gamma_2}{g_{22}g_{1B} + g_{12}g_{12}\gamma_2}, \frac{g_{12}\gamma_2\Gamma + g_{1B}n_2\gamma_2}{g_{22}g_{1B} + g_{2B}g_{12}\gamma_2}\right)$$

and $Z_2 = ((Z_2)_h, (Z_2)_v)$;

$$O_1^{l,3} = \begin{cases} (p_1^{o1}, f_{l_0}(p_1^{o1})) & \text{if } (X_0)_h < p_1^{o1} < (Z_2)_h \\ \phi & \text{otherwise} \end{cases};$$

$$O_2^{l,3} = \begin{cases} (p_1^{o2}, f_{l_0}(p_1^{o2})) & \text{if } (X_0)_h < p_1^{o2} < (Z_2)_h \\ \phi & \text{otherwise} \end{cases};$$

$$O_3^{l,3} = \begin{cases} (p_1^{o3}, f_{l_0}(p_1^{o3})) & \text{if } (X_0)_h < p_1^{o3} < (Z_2)_h \\ \phi & \text{otherwise} \end{cases};$$

$$p_1^{o1} = \frac{-B + \sqrt{B^2 - 4AC}}{2A} \text{ if } A \neq 0;$$

$$p_1^{o2} = \frac{-B - \sqrt{B^2 - 4AC}}{2A} \text{ if } A \neq 0;$$

$$p_1^{o3} = \frac{-C}{B} \text{ if } A = 0;$$

$$A = \frac{g_{2B}}{\ln 2}[g_{11}g_{12}g_{2B}(n_1g_{2B} + g_{21}\Gamma)(g_{12}g_{2B} - g_{22}g_{1B}) - g_{22}g_{21}g_{1B}(g_{1B}n_2 + g_{12}\Gamma)(g_{21}g_{1B} - g_{11}g_{2B})];$$

$$B = \frac{g_{2B}(n_1g_{2B} + g_{21}\Gamma)}{\ln 2} \times [g_{11}g_{2B}(2g_{12}g_{2B}n_2 + g_{12}g_{22}\Gamma - g_{22}g_{1B}n_2) - g_{22}(g_{1B}n_2 + g_{12}\Gamma)(g_{11}g_{2B} - 2g_{21}g_{1B})];$$

$$C = \frac{g_{2B}(n_1g_{2B} + g_{21}\Gamma)}{\ln 2} \times [g_{11}g_{2B}n_2(n_2g_{2B} + g_{22}\Gamma) - g_{22}(g_{1B}n_2 + g_{12}\Gamma)(n_1g_{2B} + g_{21}\Gamma)].$$

12. The method according to claim 3, wherein the maximizing of the two-user throughput further comprises:

when $f_{l_0}((X_1)_h) \leq (X_1)_v$ and $f_{l_0}((X_2)_h) \leq (X_2)_v$, computing the optimal power levels of SU 1 and SU 2, respectively denoted as $p^*_1$ and $p^*_2$, for maximizing the two-user throughput by $$(p_1^*, p_2^*) = \begin{cases} \arg\max_{(p_1,p_2)\in\{Z_1,Z_2,O_1^{l,2},O_2^{l,2}\}} F(p_1, p_2) & \text{if } A \neq 0, \\ \arg\max_{(p_1,p_2)\in\{Z_1,Z_2,O_3^{l,2}\}} F(p_1, p_2) & \text{if } A = 0 \end{cases};$$

where:

$$X_1 = \left(\frac{\gamma_1 n_1 + g_{21}\gamma_1 p_2^{max}}{g_{11}}, p_2^{max}\right) \text{ and } X_1 = ((X_1)_h, (X_1)_v);$$

$$X_2 = \left(\frac{g_{22}p_2^{max} - \gamma_2 n_2}{\gamma_2 g_{12}}, p_2^{max}\right) \text{ and } X_2 = ((X_2)_h, (X_2)_v);$$

$$Z_1 = \left(\frac{g_{21}\gamma_1\Gamma + g_{2B}n_1\gamma_1}{g_{11}g_{2B} + g_{1B}g_{21}\gamma_1}, \frac{g_{11}\Gamma - g_{1B}n_1\gamma_1}{g_{11}g_{2B} + g_{1B}g_{21}\gamma_1}\right)$$

and $Z_1 = ((Z_1)_h, (Z_1)_v)$;

$$Z_2 = \left(\frac{g_{22}\Gamma - g_{2B}n_2\gamma_2}{g_{22}g_{1B} + g_{12}g_{12}\gamma_2}, \frac{g_{12}\gamma_2\Gamma + g_{1B}n_2\gamma_2}{g_{22}g_{1B} + g_{2B}g_{12}\gamma_2}\right)$$

and $Z_2 = ((Z_2)_h, (Z_2)_v)$;

-continued $$O_1^{l,1} = \begin{cases} (p_1^{o_1}, f_{l_0}(p_1^{o_1})) & \text{if } (Z_1)_h < p_1^{o_1} < (Z_2)_h \\ \phi & \text{otherwise} \end{cases};$$

$$O_2^{l,1} = \begin{cases} (p_1^{o_2}, f_{l_0}(p_1^{o_2})) & \text{if } (Z_1)_h < p_1^{o_2} < (Z_2)_h \\ \phi & \text{otherwise} \end{cases};$$

$$O_3^{l,1} = \begin{cases} (p_1^{o_3}, f_{l_0}(p_1^{o_3})) & \text{if } (Z_1)_h < p_1^{o_3} < (Z_2)_h \\ \phi & \text{otherwise} \end{cases};$$

$$p_1^{o_1} = \frac{-B + \sqrt{B^2 - 4AC}}{2A} \text{ if } A \neq 0;$$

$$p_1^{o_2} = \frac{-B - \sqrt{B^2 - 4AC}}{2A} \text{ if } A \neq 0;$$

$$p_1^{o_3} = \frac{-C}{B} \text{ if } A = 0;$$

$$A = \frac{g_{2B}}{\ln 2} [g_{11} g_{12} g_{2B} (n_1 g_{2B} + g_{21} \Gamma)(g_{12} g_{2B} - g_{22} g_{1B}) - g_{22} g_{21} g_{1B} (g_{1B} n_2 + g_{12} \Gamma)(g_{21} g_{1B} - g_{11} g_{2B})];$$

$$B = \frac{g_{2B}(n_1 g_{2B} + g_{21}\Gamma)}{\ln 2} \times [g_{11} g_{2B}(2 g_{12} g_{2B} n_2 + g_{12} g_{22} \Gamma - g_{22} g_{1B} n_2) - g_{22}(g_{1B} n_2 + g_{12}\Gamma)(g_{11} g_{2B} - 2 g_{21} g_{1B})];$$

$$C = \frac{g_{2B}(n_1 g_{2B} + g_{21}\Gamma)}{\ln 2} \times [g_{11} g_{2B} n_2 (n_2 g_{2B} + g_{22}\Gamma) - g_{22}(g_{1B} n_2 + g_{12}\Gamma)(n_1 g_{2B} + g_{21}\Gamma)].$$

13. The method according to claim 3, wherein the maximizing of the two-user throughput further comprises:

when $f_{l_0}((X_1)_h) \geq (X_1)_v$ and $f_{l_0}((X_2)_h) \geq (X_2)_v$, computing the optimal power levels of SU 1 and SU 2, respectively denoted as $p^*_1$ and $p^*_2$, for maximizing the two-user throughput by $$(p_1^*, p_2^*) = \arg\max_{(p_1, p_2) \in [X_1, X_2]} F(p_1, p_2);$$

where:

$$X_1 = \left( \frac{\gamma_1 n_1 + g_{21} \gamma_1 p_2^{max}}{g_{11}}, p_2^{max} \right) \text{ and } X_1 = ((X_1)_h, (X_1)_v);$$

$$X_2 = \left( \frac{g_{22} p_2^{max} - \gamma_2 n_2}{\gamma_2 g_{12}}, p_2^{max} \right) \text{ and } X_2 = ((X_2)_h, (X_2)_v).$$

\* \* \* \* \*